United States Patent
Makita et al.

(10) Patent No.: US 11,629,634 B2
(45) Date of Patent: Apr. 18, 2023

(54) STRADDLED VEHICLE

(71) Applicant: YAMAHA HATSUDOKI KABUSHIKI KAISHA, Iwata (JP)

(72) Inventors: Naoki Makita, Shizuoka (JP); Hayatoshi Sato, Shizuoka (JP); Masaki Torigoshi, Shizuoka (JP); Makoto Kuroiwa, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 7 days.

(21) Appl. No.: 17/507,495

(22) Filed: Oct. 21, 2021

(65) Prior Publication Data

US 2022/0042448 A1 Feb. 10, 2022

Related U.S. Application Data

(63) Continuation-in-part of application No. PCT/JP2020/006026, filed on Feb. 17, 2020.

(30) Foreign Application Priority Data

Apr. 24, 2019 (JP) .............................. JP2019-082885

(51) Int. Cl.
*B62M 7/02* (2006.01)
*F02M 37/02* (2006.01)
(Continued)

(52) U.S. Cl.
CPC .............. *F02B 37/02* (2013.01); *B62M 7/02* (2013.01); *F01N 3/20* (2013.01); *F01N 2590/04* (2013.01); *F05B 2220/40* (2013.01)

(58) Field of Classification Search
CPC ... F01N 1/00; F01N 3/20; F01N 3/035; F01N 5/04; F01N 13/08; F01N 13/009;
(Continued)

(56) References Cited

U.S. PATENT DOCUMENTS 10,677,151 B2 * 6/2020 Kuroiwa ................ F02B 39/005
2006/0283418 A1 * 12/2006 Matsuda .................. F02B 75/20
123/197.1

(Continued)

FOREIGN PATENT DOCUMENTS

EP 2031200 A1 3/2009
EP 3235714 A1 10/2017
(Continued)

*Primary Examiner* — Audrey B. Walter
*Assistant Examiner* — Dapinder Singh
(74) *Attorney, Agent, or Firm* — Rabin & Berdo, P.C.

(57) ABSTRACT

A straddled vehicle having an engine unit supported by a vehicle body frame. The engine unit includes an engine body, a turbocharger, and an exhaust device. The exhaust device includes an exhaust pipe and a muffler that are connected to each other to form a portion of an exhaust passage, to allow the exhaust gas passed through the turbocharger to pass therethrough, and a first catalyst and a second catalyst that are arranged in this order along a direction in which the exhaust gas flows through the exhaust pipe. The exhaust pipe has an upstream end thereof connected to the turbocharger, a downstream end thereof connected to the muffler, and a corner section that is bent in at least a part thereof between a downstream end of the first catalyst and an upstream end of the second catalyst, the catalysts not being arranged in the corner section.

13 Claims, 6 Drawing Sheets

(51) Int. Cl.
  *F01N 3/20* (2006.01)
  *F02B 37/02* (2006.01)
(58) Field of Classification Search
  CPC .. F01N 13/10; F01N 13/1822; F01N 2330/30; F01N 2340/04; F01N 2470/00; B62M 7/02; B62M 7/04; F02B 37/02; F05B 2220/40; Y02A 50/20; Y02T 10/12
  See application file for complete search history.

(56) References Cited

U.S. PATENT DOCUMENTS

| | | |
|---|---|---|
| 2008/0060864 A1 | 3/2008 | Arai |
| 2013/0259760 A1 | 10/2013 | Kobayashi et al. |
| 2019/0120130 A1 | 4/2019 | Kuroiwa et al. |
| 2022/0041245 A1* | 2/2022 | Momiyama ............. F02B 37/00 |

FOREIGN PATENT DOCUMENTS

| | | |
|---|---|---|
| JP | H11350950 A | 12/1999 |
| JP | 2008-045515 A | 2/2008 |
| JP | 2008-064068 A | 3/2008 |
| WO | 2016/098906 A1 | 6/2016 |
| WO | 2017/217449 A1 | 12/2017 |

\* cited by examiner

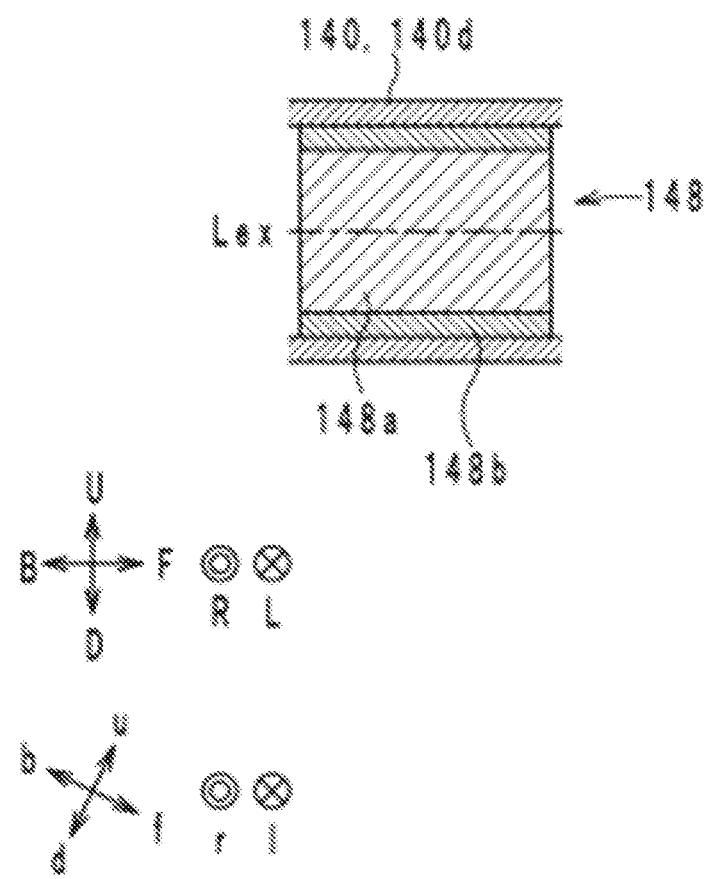

STRADDLED VEHICLE

CROSS-REFERENCE TO RELATED APPLICATIONS

This is a continuation-in-part application of International Application PCT/JP2020/006026 filed on Feb. 17, 2020, which claims priority from a Japanese Patent Application No. 2019-082885, filed on Apr. 24, 2019. The contents of the applications are incorporated herein by reference.

TECHNICAL FIELD

The present teaching relates to a straddled vehicle comprising a turbocharger.

BACKGROUND ART

A straddled vehicle described in Patent Document 1 is known as a teaching related to a conventional straddled vehicle, for example. The straddled vehicle described in Patent Document 1 comprises an exhaust device. The exhaust device purifies exhaust gas flowed out of an engine body and discharges it to the atmosphere. An upstream end portion of the exhaust device is connected to the exhaust outlet of the cylinder head of the engine body. The downstream end of the exhaust device is an air outlet of a muffler. The exhaust device has two catalysts (upstream catalyst and downstream catalyst). The upstream catalyst and the downstream catalyst are arranged in this order respectively between the upstream end and the downstream end of the exhaust device.

PRIOR ART DOCUMENTS

Patent Document

[Patent Document 1] WO2017/217449

SUMMARY OF THE INVENTION

Problem to be Solved by the Invention

In straddled vehicles configured as described above, it is desired to improve the purification performance of an exhaust device by increasing the size of a catalyst. However, as a catalyst increases its size, an exhaust device increases its weight accordingly. As a result, the vibration of the engine body or the like causes the exhaust device to vibrate, and the exhaust device becomes more likely to be largely displaced relative to the vehicle body frame and the engine body. In particular, a straddled vehicle has restricted positions where the exhaust device is supported by the vehicle body frame or the engine body. Thus, places and numbers of the exhaust device supported by the vehicle body frame or the engine body would be limited.

Consequently, it is difficult to suppress large displacement of the exhaust device relative to the vehicle body frame and the engine body.

Accordingly, it is an object of the present teaching to provide a straddled vehicle in which the size of a catalyst can be increased and large displacement of an exhaust device relative to a vehicle body frame and an engine body can be suppressed.

Means to Solve the Problem

In order to solve the above problems, the present teaching comprises as follows.

A straddled vehicle of (1) comprising: a vehicle body frame; an engine unit supported by the vehicle body frame, the engine unit including: an engine body having a cylinder head, through which exhaust gas flows out; a turbocharger for compressing intake air by the exhaust gas flowed out from the engine body and for supplying the intake air to the engine body; an exhaust device including: an exhaust pipe and a muffler that are connected to each other to form a portion of an exhaust passage through which the exhaust gas passes, the portion allowing the exhaust gas passed through the turbocharger to pass therethrough; a plurality of catalysts including a first catalyst and a second catalyst that are arranged in this order respectively along the direction in which the exhaust gas flows through the exhaust pipe, wherein: an upstream end of the exhaust pipe is connected to the turbocharger, a downstream end portion of the exhaust pipe is connected to the muffler, the exhaust pipe includes a corner section, the angle of which is bent, in at least a part between a downstream end of the first catalyst and an upstream end of the second catalyst, the plurality of the catalysts is not arranged in the corner section, the volume of the second catalyst is more than or equal to half of the volume of the first catalyst, the cross-sectional area of an internal space of the exhaust pipe being orthogonal to a direction in which the exhaust gas flows is defined as an exhaust pipe internal area, the maximum value of the exhaust pipe internal area between the upstream end of the exhaust pipe and an upstream end of the first catalyst is more than or equal to the maximum value of the exhaust pipe internal area between the upstream end of the first catalyst and the downstream end of the first catalyst, the maximum value of the exhaust pipe internal area between the downstream end of the first catalyst and the upstream end of the second catalyst is more than or equal to the maximum value of the exhaust pipe internal area between the upstream end of the second catalyst and a downstream end of the second catalyst.

In the straddled vehicle of (1), the size of a catalyst can be increased, and large displacement of the exhaust device relative to the vehicle body frame and the engine body can be suppressed. More specifically, in the straddled vehicle of (1), the volume of the second catalyst is more than or equal to half of the volume of the first catalyst. Thus, the straddled vehicle of (1) has a large second catalyst.

However, as the second catalyst increases its size, the exhaust device increases its weight. In this case, the exhaust device is likely to be largely displaced relative to the vehicle body frame and the engine body caused by vibration or the like. In order to suppress displacement of the exhaust device relative to the vehicle body frame and the engine body caused by vibration or the like, it is desirable that the exhaust device is firmly supported by the vehicle body frame or the engine body. However, in the straddled vehicle of (1), there are restrictions in position where the exhaust device is supported by the body frame or the engine body.

Accordingly, the maximum value of the exhaust pipe internal area between the upstream end of the exhaust pipe and the upstream end of the first catalyst is more than or equal to the maximum value of the exhaust pipe internal area between the upstream end of the first catalyst and the downstream end of the first catalyst. Further, the maximum value of the exhaust pipe internal area between the downstream end of the first catalyst and the upstream end of the second catalyst is more than or equal to the maximum value of the exhaust pipe internal area between the upstream end of the second catalyst and the downstream end of the second catalyst. Thereby, as described below, the rigidity of the exhaust device can be increased, which suppresses large displacement of the exhaust device relative to the vehicle body frame and the engine body caused by vibration or the like.

The maximum value of the exhaust pipe internal area between the upstream end of the exhaust pipe and the upstream end of the first catalyst is more than or equal to the maximum value of the exhaust pipe internal area between the upstream end of the first catalyst and the downstream end of the first catalyst. As a result, the vicinity of the upstream end of the exhaust pipe becomes thicker, and the rigidity of the vicinity of the upstream end of the exhaust pipe increases. The upstream end of the exhaust pipe is connected to a turbocharger. This results in increased rigidity of the vicinity of the portion of the exhaust pipe supported by the turbocharger. Such increased rigidity suppresses the large displacement of the portion downstream of the vicinity of the upstream end of the exhaust pipe relative to the turbocharger.

By the way, the corner section is bent. Accordingly, extending direction of the portion which is positioned farther in the downstream than the corner section of the exhaust pipe is different from that of the portion which is positioned farther in the upstream than the corner section of the exhaust pipe. Thus, even if the increased rigidity of the vicinity of the portion of the exhaust pipe supported by the turbocharger can suppress the vibration of the portion which is positioned farther in the upstream than the corner section of the exhaust pipe, the portion of the exhaust pipe which is positioned farther in the downstream than the corner section of the exhaust pipe can largely vibrate.

Accordingly, in the straddled vehicle of (1), the maximum value of the exhaust pipe internal area between the downstream end of the first catalyst and the upstream end of the second catalyst is more than or equal to the maximum value of the exhaust pipe internal area between the upstream end of the second catalyst and the downstream end of the second catalyst. Thereby, the thickness of the corner section of the exhaust pipe increases. Thus, rigidity of the corner section of the exhaust pipe is increased. Accordingly, the large vibration of the portion which is positioned farther in the downstream than the corner section of the exhaust pipe is suppressed. As a result, large displacement of the exhaust device relative to the vehicle body frame and the engine body caused by vibration or the like is suppressed.

A straddled vehicle of (2) is according to the straddled vehicle of (1), wherein the plurality of catalysts is not arranged between the downstream end of the first catalyst and the upstream end of the second catalyst of the exhaust pipe.

In the straddled vehicle of (2), the size of the plurality of catalysts can be increased. More specifically, the corner section is bent, and thus it is difficult to arrange a large catalyst in such corner section. That is, when a catalyst is arranged in the corner section, the catalyst becomes smaller. Accordingly, the plurality of catalysts is not arranged between the downstream end of the first catalyst and the upstream end of the second catalyst of the exhaust pipe in the straddled vehicle of (2). As a result, the catalyst can be enlarged according to the straddled vehicle of (2).

A straddled vehicle of (3) is according to either the straddled vehicle of (1) or (2), wherein the exhaust gas passes downward through the first catalyst, and passes backward through the second catalyst.

A straddled vehicle of (4) is according to any one of the straddled vehicles of (1) to (3), wherein the maximum value of the exhaust pipe internal area between the downstream end of the second catalyst and a downstream end of the exhaust pipe is more than or equal to the maximum value of the exhaust pipe internal area between the upstream end of the second catalyst and the downstream end of the second catalyst.

According to the straddled vehicle of (4), large displacement of the exhaust device relative to the vehicle body frame and the engine body can be suppressed. More specifically, the downstream end portion of the exhaust pipe is connected to the muffler. The muffler has a large weight. In order to suppress vibration of the muffler, it is preferable that the muffler is firmly supported by the exhaust pipe. Accordingly, the maximum value of the exhaust pipe internal area between the downstream end of the second catalyst and the downstream end of the exhaust pipe is more than or equal to the maximum value of the exhaust pipe internal area between the upstream end of the second catalyst and the downstream end of the second catalyst. Thereby, the thickness of the vicinity of the downstream end portion of the exhaust pipe increases. In other words, the rigidity of the vicinity of the downstream end portion of the exhaust pipe increases. As a result, the muffler becomes firmly supported by the exhaust pipe. Consequently, according to the straddled vehicle of (4), large displacement of the exhaust device relative to the vehicle body frame and the engine body can be suppressed.

A straddled vehicle of (5) is according to any one of the straddled vehicles of (1) to (4), wherein the turbocharger is fixed to the engine body, and the muffler is fixed to the vehicle body frame or the engine body.

In the straddled vehicle of (5), the vicinity of both ends of the exhaust device is fixed to the vehicle body frame or the engine body. From this, large displacement of the exhaust device relative to the vehicle body frame and the engine body can be suppressed.

A straddled vehicle of (6) is according to any one of the straddled vehicles of (1) to (5), wherein the second catalyst is located below a combustion chamber of the engine body when viewed in the left-right direction.

A straddled vehicle of (7) is according to any one of the straddled vehicles of (1) to (6), wherein the maximum value of the cross-sectional area of the second catalyst is more than or equal to half of the maximum value of the cross-sectional area of the first catalyst and less than or equal to the maximum value of the cross-sectional area of the first catalyst, the cross-sectional area of the first catalyst being orthogonal to the direction in which the exhaust gas flows through the first catalyst, the cross-sectional area of the second catalyst being orthogonal to the direction in which the exhaust gas flows through the second catalyst.

According to the straddled vehicle of (7), exhaust resistance becomes smaller. More specifically, the maximum value of the cross-sectional area of the second catalyst is more than or equal to half of the maximum value of the cross-sectional area of the first catalyst and less than or equal to the maximum value of the cross-sectional area of the first catalyst. Therefore, the maximum value of the cross-sectional area of the second catalyst is large. When the volume of the second catalyst is fixed, the length of the second catalyst in the direction along which the exhaust gas flows becomes shorter as the maximum value of the cross-sectional area of the second catalyst increases. From this, the exhaust resistance of the second catalyst can be reduced.

A straddled vehicle of (8) is according to any one of the straddled vehicles of (1) to (7), wherein the volume of the second catalyst is less than or equal to the volume of the first catalyst.

A straddled vehicle of (9) is according to any one of the straddled vehicles of (1) to (8), wherein the engine body has an exhaust port through which the exhaust gas passes. The length of the exhaust passage from a downstream end of the exhaust port to the upstream end of the first catalyst is shorter than the length of the exhaust passage from the upstream end of the first catalyst to the downstream end of the second catalyst.

In the straddled vehicle of (9), the length of the exhaust passage from the downstream end of the exhaust port to the upstream end of the first catalyst is shorter than the length of the exhaust passage from the upstream end of the first catalyst to the downstream end of the second catalyst. From this, the length of the exhaust passage from the downstream end of the exhaust port to the upstream end of the first catalyst is short. Accordingly, exhaust gas at a high temperature passes through the first catalyst. As a result, the first catalyst can show high purification performance.

A straddled vehicle of (10) is according to any one of the straddled vehicles of (1) to (9), wherein the length of the exhaust passage from the downstream end of the second catalyst to the downstream end of the exhaust pipe is shorter than the length of the exhaust passage from the upstream end of the first catalyst to the downstream end of the second catalyst.

A straddled vehicle of (11) is according to any one of the straddled vehicles of (1) to (10), wherein the minimum value of the exhaust pipe internal area of the corner section is more than or equal to the exhaust pipe internal area of the downstream end of the exhaust pipe.

A straddled vehicle of (12) is according to any one of the straddled vehicles of (1) to (11), wherein the cross-sectional area of the exhaust passage is the cross-sectional area being orthogonal to the direction in which the exhaust gas flows through the exhaust passage, and the minimum value of the exhaust pipe internal area of the corner section is more than or equal to the cross-sectional area of the exhaust passage of an upstream end of the turbocharger.

A straddled vehicle of (13) is according to any one of the straddled vehicles of (1) to (12), wherein the length of the first catalyst in the direction along which the exhaust gas flows is larger than the diameter of the first catalyst, and/or the length of the second catalyst in the direction along which the exhaust gas flows is larger than the diameter of the second catalyst.

The foregoing and other objects, features, aspects and advantages of the present teaching will become more apparent from the following detailed description of embodiments of the present teaching in connection with the accompanying drawings.

As used herein, the term "and/or" includes any or all combinations of one or more related listed items.

The terms "including", "comprising", or "having", and variations thereof used herein specify the presence of stated features, steps, operations, elements, components, and/or equivalents thereof, and can include one or more of steps, operations, elements, components, and/or their groups.

Unless otherwise defined, all terms used herein (including technical and scientific terms) have the same meaning as commonly understood by one of ordinary skilled in the art to which the present teaching belongs.

Terms such as those defined in commonly used dictionaries should be interpreted as having a meaning consistent with the meaning in the context of the relevant art and in the present disclosure, and they will not be interpreted in an ideal or overly formal sense unless explicitly so defined herein.

It is understood that the description of the present teaching discloses the number of techniques and steps. Each of these has particular benefits, and each can also be used in conjunction with one or more, or in some cases, all of the other disclosed techniques. Therefore, for clarity, this description refrains from unnecessarily repeating all possible combinations of individual steps. Nevertheless, the description and claims should be read with the understanding that such combinations are entirely within the scope of the present teaching and claims.

For purposes of explanation, the following description will describe a lot of specific details in order to provide complete understandings of the present teaching. However, it will be apparent to those skilled in the art that the teaching can be implemented without these particular details. The present disclosure should be considered as an example of the present teaching and is not intended to limit the present teaching to the specific embodiments shown by the following drawings or descriptions.

Effects of the Invention

According to the present teaching, it is possible to increase the size of the catalyst and to suppress large displacement of the exhaust device relative to the vehicle body frame and the engine body.

BRIEF DESCRIPTION OF THE DRAWINGS

FIG. 6 is a cross-sectional structure view of the exhaust pipe 140 and a second catalyst 148.

DESCRIPTION OF EMBODIMENTS

Embodiments

[Configuration of the Straddled Vehicle]

Figure 1:
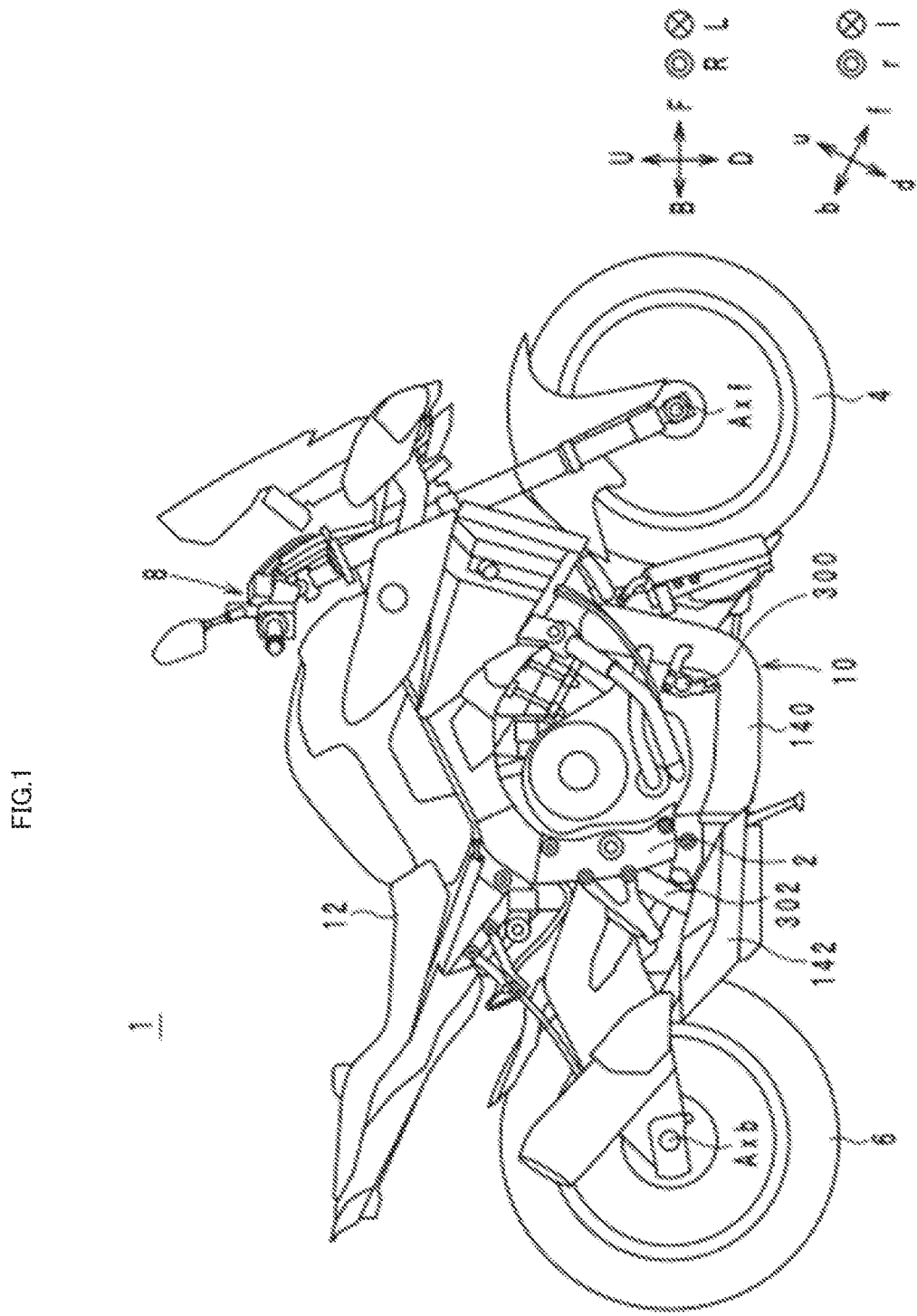
FIG. 1 is a right side view of a straddled vehicle 1.

A straddled vehicle according to one embodiment of the present teaching will be described below with reference to the drawings. FIG. 1 is a right side view of the straddled vehicle 1.

Hereinafter, forward of the straddled vehicle 1 is defined as forward F (forward of vehicle). Backward of the straddled vehicle 1 is defined as backward B (backward of vehicle). Leftward of the straddled vehicle 1 is defined as leftward L (leftward of vehicle). Rightward of the straddled vehicle 1 is defined as rightward R (rightward of vehicle). Upward of the straddled vehicle 1 is defined as upward U (upward of vehicle). Downward of the straddled vehicle 1 is defined as downward D (downward of vehicle). A front-back direction of the straddled vehicle 1 is defined as the front-back direction FB (front-back direction of vehicle). A left-right direction of the straddled vehicle 1 is defined as the left-right direction LR (left-right direction of vehicle). An up-down direction of the straddled vehicle 1 is defined as the up-down direction UD (up-down direction of vehicle). Forward of the straddled vehicle 1 refers to forward with respect to a rider on the straddled vehicle 1. Backward of the straddled vehicle 1 refers to backward with respect to a rider on the straddled vehicle 1. Leftward of the straddled vehicle 1 refers to leftward with respect to a rider on the straddled vehicle 1. Rightward of the straddled vehicle 1 refers to rightward with respect to the rider on the straddled vehicle 1. Upward of the straddled vehicle 1 refers to upward with respect to a rider on the straddled vehicle 1. Downward of the straddled vehicle 1 refers to downward with respect to a rider on the straddled vehicle 1.

In the present specification, axes and members extending in the front-back direction does not necessarily indicate only axes and members that are parallel to the front-back direction. The phrase, "The axes and members extending in the front-back direction" encompasses axes and members slanting at an angle degree range within ±45 degrees with respect to the front-back direction. Similarly, the phrase, "The axes and members extending in the up-down direction" encompasses axes and members slanting at an angle degree range within ±45 degrees with respect to the up-down direction. The phrase, "The axes and members extending in the left-right direction" encompasses axes and members slanting at an angle degree range within ±45 degrees with respect to the left-right direction. The upright position of the vehicle body frame means a position in which a front wheel is neither steered nor leaned while a rider is not on the vehicle and fuel is not mounted on the straddled vehicle 1.

When any two members in the present specification are defined as a first member and a second member, the relationship between the two members means as follows. In the present specification, the phrase "The first member is supported by the second member" includes a case where the first member is attached to the second member so as to be immovable (i.e., fixed) with respect to the second member, and a case where the first member is attached to the second member so as to be movable with respect to the second member. In addition, the phrase "The first member is supported by the second member" includes both cases where the first member is directly attached to the second member and where the first member is attached to the second member via the third member.

In the present description, the phrase "The first member and the second member are arranged in the front-back direction" indicates the state as follows. When the first member and the second member are viewed in a direction orthogonal to the front-back direction, both the first member and the second member are arranged on any straight lines extending in the front-back direction. In the present description, the phrase "The first member and the second member are arranged in the front-back direction when viewed in the up-down direction" indicates the state as follows. When the first member and the second member are viewed in the up-down direction, both the first member and the second member are arranged on any straight lines indicating the front-back direction. In this case, when the first member and the second member are viewed in the left-right direction different to the up-down direction, either one of the first member and the second member does not have to be arranged on any straight lines indicating the front-back direction. The first member and the second member may be in contact with each other. The first member and the second member may be away from each other. There may be a third member between the first member and the second member. This definition is also applied to directions other than the front-back direction.

In the present description, the phrase "The first member is arranged more frontward direction of the second member" indicates the state as follows. At least a part of the first member is within a region through which the second member passes when the second member is translated forward. Thus, the first member may be within a region through which the second member passes when the second member is translated forward, or may project from a region through which the second member passes when the second member is translated forward. In this case, the first member and the second member are arranged in the front-back direction. This definition is also applied to directions other than the front-back direction.

In the present description, the phrase "The first member is arranged farther in the forward direction of the second member" indicates the state as follows. The first member is arranged ahead of a plane passing through a front end of the second member and orthogonal to the front-back direction. In this case, the first member and the second member may or does not have to be arranged in the front-back direction. This definition is also applied to directions other than the front-back direction.

In the present description, the phrase "The first member is arranged more frontward direction than the second member when viewed in the left-right direction" indicates the state as follows. When viewed in the left-right direction, at least a part of the first member is within an area through which the second member passes when the second member is translated forward. In this definition, the first member and the second member do not have to be arranged in the front-back direction in three dimensions. This definition is also applied to directions other than the front-back direction.

In this specification, unless otherwise described, each portion of the first member is defined as follows. The front portion of the first member means the front half of the first member. The rear portion of the first member means the rear half of the first member. The left portion of the first member means the left half of the first member. The right portion of the first member means the right half of the first member. The upper portion of the first member means the upper half of the first member. The lower portion of the first member means the lower half of the first member. The upper end of the first member means the end of the first member in the up direction. The lower end of the first member means the end of the first member in the down direction. The front end of the first member means the end of the first member in the front direction. The rear end of the first member means the end of the first member in the back direction. The left end of the first member means the end of the first member in the left direction. The right end of the first member means the end of the first member in the right direction. The upper end portion of the first member means the upper end of the first member and the vicinity thereof. The lower end portion of the first member means the lower end of the first member and the vicinity thereof. The front end portion of the first member means the front end of the first member and the vicinity thereof. The rear end portion of the first member means the rear end of the first member and the vicinity thereof. The left end portion of the first member means the left end of the first member and the vicinity thereof. The right end portion of the first member means the right end of the first member and the vicinity thereof. The first member means a member comprising the straddled vehicle 1.

In the present description, the phrase "A component (a member, a space or an opening) is formed (positioned or provided) between the first member and the second member" means that there is a component between the first member and the second member in a direction in which the first member and the second member are arranged. It is noted that such a component may or does not have to project from the first member or the second member to a direction orthogonal to the direction in which the first member and the second member are arranged.

As shown in FIG. 1, one example of the straddled vehicle 1 is a motorcycle. The straddled vehicle 1 comprises a vehicle body frame 2, a front wheel 4, a rear wheel 6, a steering mechanism 8, an engine unit 10 and a seat 12. The vehicle body frame 2 is leaned leftward L when the straddled vehicle 1 turns leftward L. The vehicle body frame 2 is leaned rightward R when the straddled vehicle 1 turns rightward R. Examples of the vehicle body frame 2 include a cradle frame, a diamond frame, a truss frame, a twin spar frame, a monocoque frame.

The seat 12 is arranged above the vehicle body frame 2. The seat 12 is supported by the vehicle body frame 2. A rider seats on the seat 12 so as to straddle it. A vehicle comprising the seat 12 that a rider straddles is referred to as a straddled vehicle.

The steering mechanism 8 is supported by the front portion of the vehicle body frame 2. The steering mechanism 8 steers the front wheel 4 by rider's operation. The steering mechanism 8 includes a handle, a steering shaft and a front fork. The structure of the handle, the steering shaft, and the front fork is the same as that of a common handle, a common steering shaft, and a common front fork, and thus the description thereof is omitted.

The front wheel 4 is a steering wheel of the straddled vehicle 1. The front wheel 4 is arranged at the front portion of the straddled vehicle 1. The front wheel 4 is supported by the vehicle body frame 2 via the steering mechanism 8. In addition, a rider can steer the front wheel 4 by operating the handle of the steering mechanism 8. The front wheel 4 can rotate on the front axle Axf.

The rear wheel 6 is a drive wheel of the straddled vehicle 1. The rear wheel 6 is arranged at the rear portion of the straddled vehicle 1. The rear wheel 6 is supported by the vehicle body frame 2 via a swing arm. The rear wheel 6 is rotated on the rear axle Axb by driving force of an engine unit 10, which will be described later.

The engine unit 10 is supported by the vehicle body frame 2. The engine unit 10 is arranged both backward B of the front wheel 4 and forward F of the rear wheel 6. In other words, the front wheel 4 is arranged forward F of the engine unit 10. The rear wheel 6 is arranged backward B of the engine unit 10. The engine unit 10 generates driving force for rotating the rear wheel 6. The driving force generated by the engine unit 10 is transmitted to the rear wheel 6 via a transmission mechanism. Thus, the rear wheel 6 is rotated by the driving force generated by the engine unit 10.

[Structure of the Engine Unit]

Figure 2:
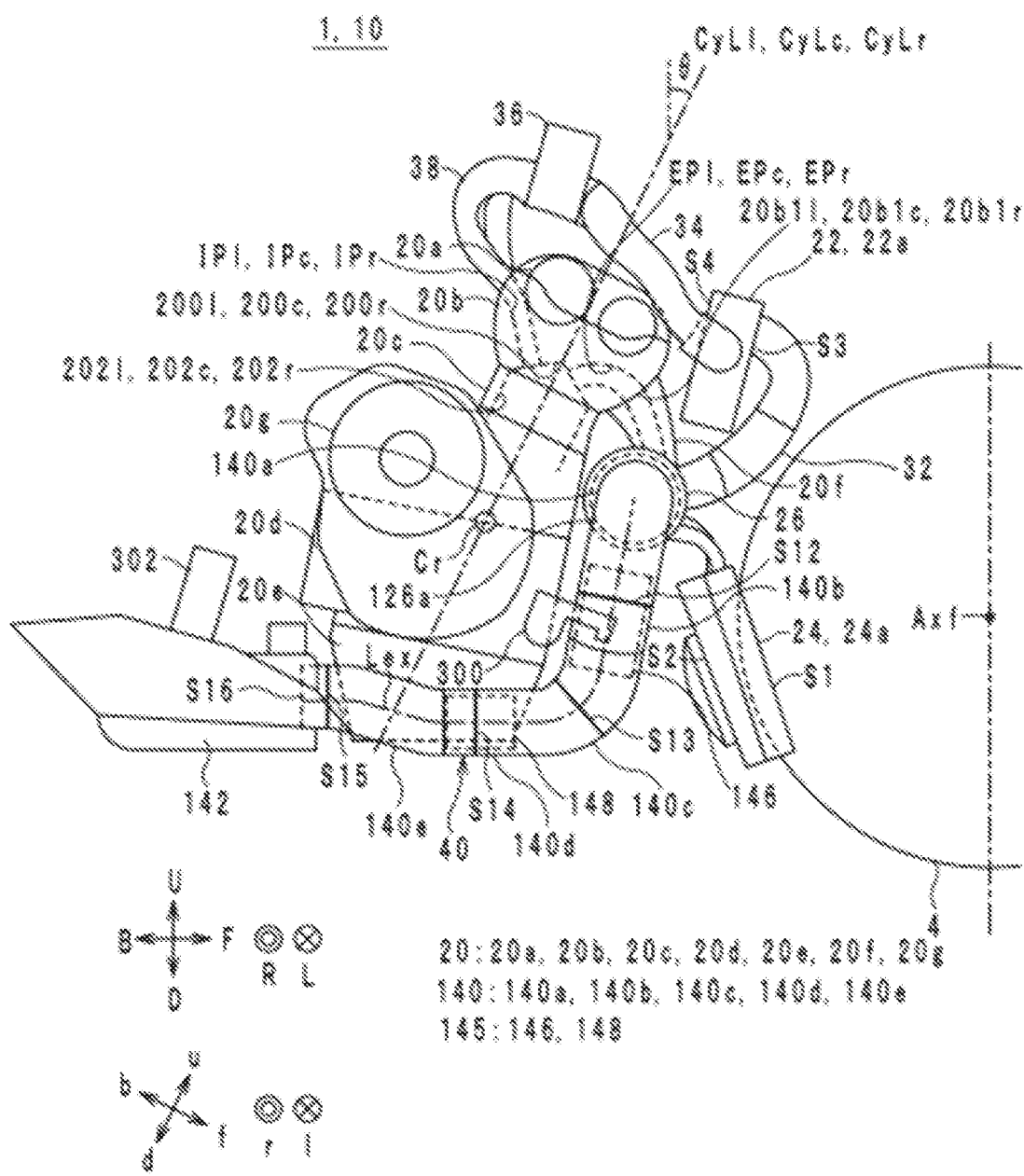
FIG. 2 is a right side view of an engine unit 10 of the straddled vehicle 1.
Figure 3:
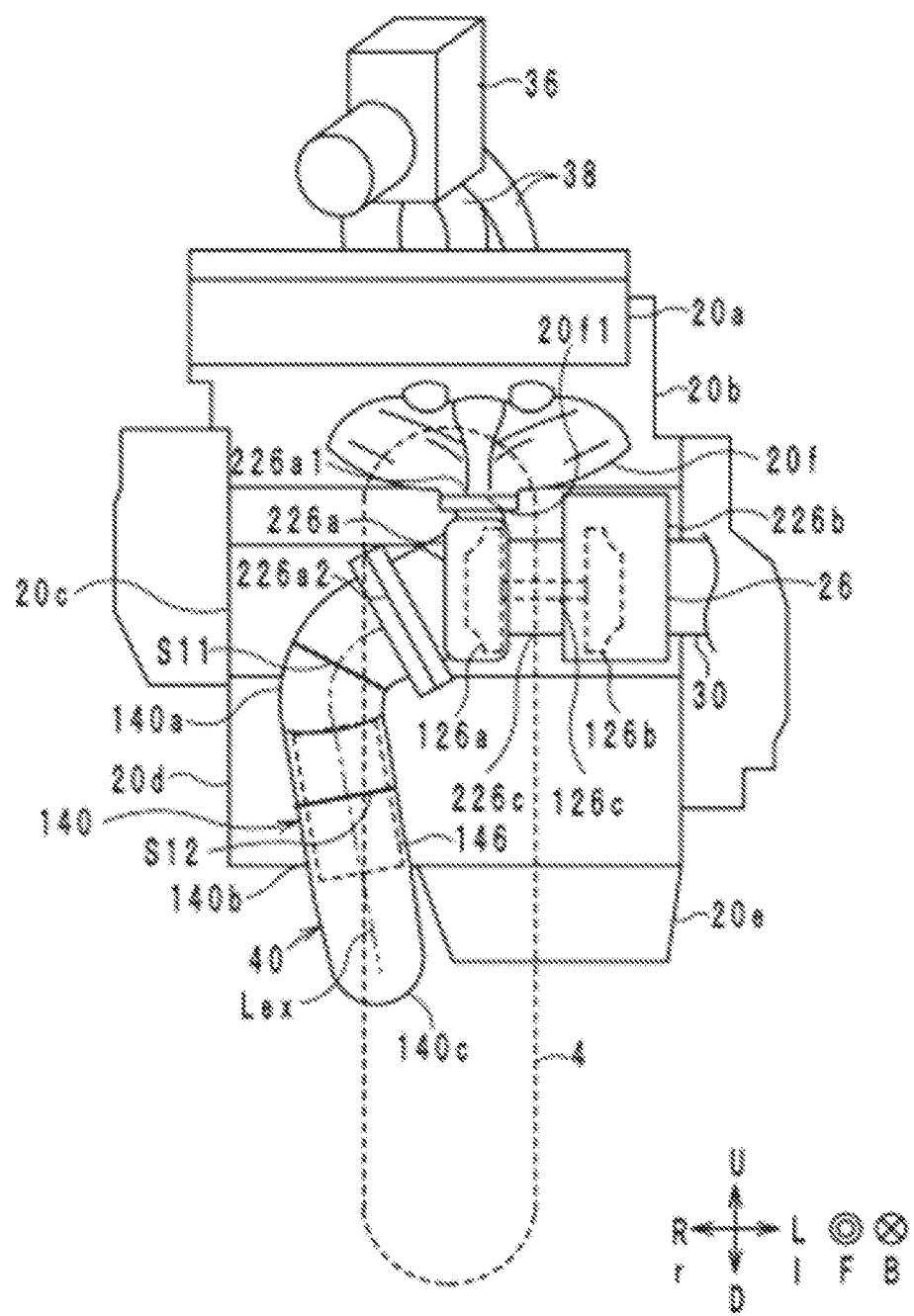
FIG. 3 is a front view of the engine unit 10 of the straddled vehicle 1.
Figure 4:
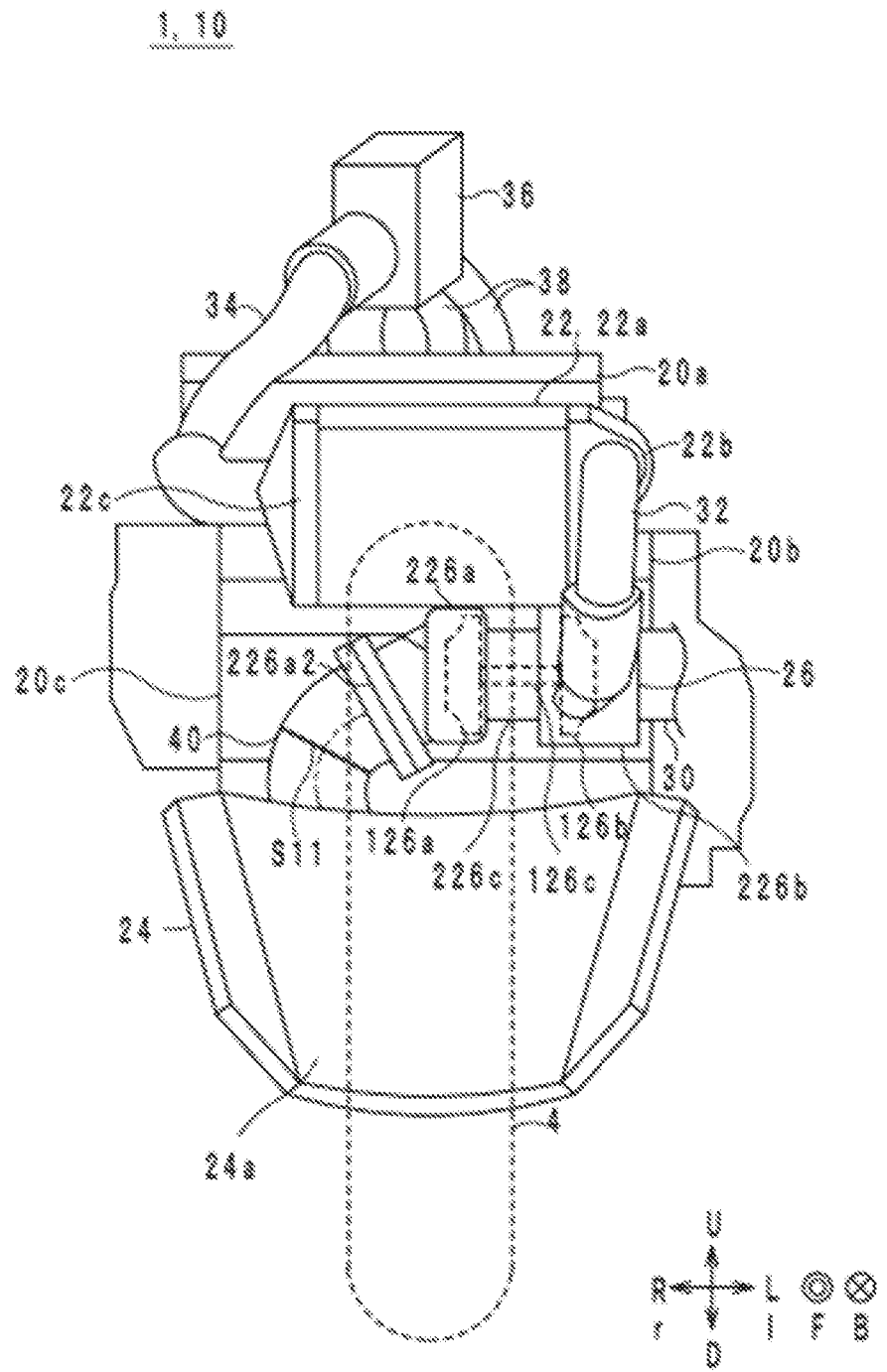
FIG. 4 is a front view of the engine unit 10 of the straddled vehicle 1.

Next, the structure of the engine unit 10 will be described with reference to the drawings. FIG. 2 is a right side view of the engine unit 10 of the straddled vehicle 1. FIGS. 3 and 4 are front views of the engine unit 10 of the straddled vehicle 1. FIG. 3 does not show an intercooler 22 and a radiator 24. FIG. 4 shows the intercooler 22 and the radiator 24.

As shown in FIG. 2, the engine unit 10 is a parallel three-cylinder engine. The engine unit 10 is a four-stroke engine. Therefore, the engine unit 10 performs an intake process, a compression process, a combustion process, and an exhaust process while the piston reciprocates two times. It is noted that the engine unit 10 may be a two-stroke engine. The engine unit 10 comprises an engine body 20, the intercooler 22, the radiator 24, a turbocharger 26, an upstream intake pipe 30 (See FIG. 3), a midstream intake pipe 32, a downstream intake pipe 34, a throttle body 36, an intake manifold 38, and an exhaust device 40.

The engine body 20 is arranged backward B of the front wheel 4. The engine body 20 does not overlap with the front wheel 4 when viewed in the down direction D. The engine body 20 has a left cylinder axis CyLl, a middle cylinder axis CyLc, and a right cylinder axis CyLr slanting forward F at an angle degree of 45° or less with respect to the up-down direction UD. More specifically, the engine body 20 includes a cylinder head cover 20a, a cylinder head 20b, a cylinder block 20c, a crankcase 20d, an oil pan 20e, an exhaust manifold 20f, and a transmission 20g. The engine body 20 further includes a left intake valve, a middle intake valve, a right intake valve, a left exhaust valve, a middle exhaust valve, a right exhaust valve, an intake camshaft, an exhaust camshaft, a left piston, a middle piston, a right piston, a left connecting rod, a middle connecting rod, a right connecting rod, and a crankshaft (not shown). It is noted that the engine body 20 does not include components such as an oil filter, an engine accessory.

A left cylinder hole 202l, a middle cylinder hole 202c and a right cylinder hole 202r having a cylindrical shape and a central axis extending in the up-down direction UD are formed on the upper portion of the cylinder block 20c. The left cylinder hole 202l, the middle cylinder hole 202c, and the right cylinder hole 202r are arranged in the left-right direction LR. The middle cylinder hole 202c is positioned to the right of the left cylinder hole 202l. The right cylinder hole 202r is positioned to the right of the middle cylinder hole 202c.

The central axes of the left cylinder hole 202l, the middle cylinder hole 202c, and the right cylinder hole 202r are referred to as a left cylinder axis CyLl, a middle cylinder axis CyLc, and a right cylinder axis CyLr, respectively. The left cylinder axis CyLl, the middle cylinder axis CyLc, and the right cylinder axis CyLr are slanting forward F by a forward slant angle θ with respect to the up-down direction UD. The forward slant angle θ is an angle of 45° or less. However, the left cylinder axis CyLl, the middle cylinder axis CyLc, and the right cylinder axis CyLr are not slanting in the left-right direction LR with respect to the up-down direction UD. The shapes of the left cylinder hole 202l, the middle cylinder hole 202c, and the right cylinder hole 202r are not limited to be cylindrical, and may be an elliptic cylindrical. In this case, the left cylinder axis CyLl, the middle cylinder axis CyLc, and the right cylinder axis CyLr are straight lines passing through the midpoints of the two focal points of the ellipse.

Here, a direction in which the right cylinder axis CyLr extends is defined as the up-down direction ud. A direction slanting forward F at an angle degree of 90° with respect to the right cylinder axis CyLr is defined as the front-back direction fb. A direction orthogonal to the up-down direction ud and the front-back direction fb is defined as the left-right direction lr. The left-right direction lr coincides with the left-right direction LR. Further, direction to go upward U in the up-down direction ud is defined as upward u. Direction to go downward D in the up-down direction ud is defined as downward d. Direction to go forward F in the front-back direction fb is defined as forward f. Direction to go backward B in the front-back direction fb is defined as backward b. Direction to go leftward L in the left-right direction lr is defined as leftward l. Direction to go rightward R in the left-right direction lr is defined as rightward r.

The left piston (not shown) is arranged in the left cylinder hole 202l. The left piston reciprocates in the left cylinder hole 202l in the up-down direction ud in accordance with the rotation of the crankshaft (not shown). The left piston is connected to the crankshaft by a left connecting rod (not shown).

The middle piston (not shown) is arranged in the middle cylinder hole 202c. The middle piston reciprocates in the middle cylinder hole 202c in the up-down direction ud according to the rotation of the crankshaft (not shown). The middle piston is connected to the crankshaft by a middle connecting rod (not shown).

The right piston (not shown) is arranged in the right cylinder hole 202r. The right piston reciprocates in the right cylinder hole 202r in the up-down direction ud in accordance with the rotation of the crankshaft (not shown). The right piston is connected to the crankshaft by a right connecting rod (not shown).

A lower portion of the cylinder block 20c defines an upper portion of a crank chamber for housing a crankshaft. In other words, the lower portion of the cylinder block 20c is the upper portion of a crankcase.

The crankcase 20d is arranged downward d of the cylinder block 20c. The crankcase 20d is fixed to a cylinder block 20c. The crankcase 20d defines a lower portion of a crank chamber for housing a crankshaft. In other words, the crankcase 20d is the lower portion of the crankcase. In this way, the lower portion of the cylinder block 20c and the crankcase 20d define the crank chamber.

The cylinder block 20c and the crankcase 20d support the crankshaft (not shown). The crankshaft rotates on a crankshaft axis Cr extending in the left-right direction lr. The crankshaft axis Cr overlaps the joining surface of the cylinder block 20c and the crankcase 20d when viewed in the left direction 1. The crankshaft axis Cr and the left cylinder axis CyLl intersect each other. The crankshaft axis Cr and the middle cylinder axis CyLc intersect each other. The crankshaft axis Cr and the right cylinder axis CyLr intersect each other.

The transmission 20g transmits the rotation of the crankshaft to the rear wheel 6. The transmission 20g changes the rotational speed and torque of the crankshaft. The transmission 20g is arranged backward B of the crankshaft. The transmission 20g is housed in a crank chamber defined by the lower portion of a cylinder block 20c and a crankcase 20d.

The oil pan 20e is arranged downward d of the crankcase 20d. The oil pan 20e is fixed to the crankcase 20d. The oil pan 20e has a tray shape. The oil pan 20e stores lubricating oil (engine oil).

The cylinder head 20b is arranged upward u of the cylinder block 20c. The cylinder head 20b is fixed to a cylinder block 20c. The cylinder head 20b has a left combustion chamber 200l, a middle combustion chamber 200c, a right combustion chamber 200r, a left intake port IPl, a middle intake port IPc, a right intake port IPr, a left exhaust port EPl, a middle exhaust port EPc and a right exhaust port EPr.

The left combustion chamber 200l, the middle combustion chamber 200c and the right combustion chamber 200r are spaces formed in the cylinder head 20b. The left combustion chamber 200l, the middle combustion chamber 200c, and the right combustion chamber 200r are provided so as to correspond to the left cylinder hole 202l, the middle cylinder hole 202c, and the right cylinder hole 202r, respectively. The left combustion chamber 200l, the middle combustion chamber 200c and the right combustion chamber 200r are arranged in the left-right direction LR. The middle combustion chamber 200c is located rightward R of the left combustion chamber 200l. The right combustion chamber 200r is located rightward R of the middle combustion chamber 200c.

The left combustion chamber 200l is a space surrounded by a left piston (not shown) located at the top dead center, a cylinder head 20b, a left intake valve (not shown), and a left exhaust valve (not shown). The left combustion chamber 200l is connected to the left cylinder hole 202l. The left combustion chamber 200l is a space for combustion of a mixture of fuel (e.g., gasoline) and air. The left intake port IPl is a hole connecting the outside of the engine body 20 and the left combustion chamber 200l. The left intake port IPl directs intake air into the left combustion chamber 200l. Accordingly, the intake air passes through the left intake port IPl. The left intake port IPl opens on the rear surface of the cylinder head 20b. The left exhaust port EPl is a hole connecting the outside of the engine body 20 and the left combustion chamber 200l. The left exhaust port EPl directs exhaust gas generated by combustion of the mixture of fuel and air to the outside of the engine body 20. Thus, exhaust gas passes through the left exhaust port EPl. As described above, the left exhaust port EPl is part of an exhaust passage through which exhaust gas passes. The left exhaust port EPl opens on the front surface of the cylinder head 20b. Accordingly, a left head exhaust outlet 20b1l, through which exhaust gas flows out, is provided on the front surface of the cylinder head 20b. Thus, exhaust gas flows out from the cylinder head 20b.

The middle combustion chamber 200c is a space surrounded by a left piston (not shown) located at the top dead center, a cylinder head 20b, a middle intake valve (not shown), and a middle exhaust valve (not shown). The middle combustion chamber 200c is connected to the middle cylinder hole 202c. The middle combustion chamber 200c is a space for combustion of a mixture of fuel (e.g., gasoline) and air. The middle intake port IPc is a hole connecting the outside of the engine body 20 and the middle combustion chamber 200c. The middle intake port IPc directs intake air into a middle combustion chamber 200c. Accordingly, the intake air passes through the middle intake port IPc. The middle intake port IPc opens on the rear surface of the cylinder head 20b. The middle exhaust port EPc is a hole connecting the outside of the engine body 20 and the middle combustion chamber 200c. The middle exhaust port EPc directs exhaust gas generated by combustion of the mixture of fuel and air to the outside of the engine body 20. Thus, exhaust gas passes through the middle exhaust port EPc. Thus, the middle exhaust port EPc is part of an exhaust passage through which exhaust gas passes. The middle exhaust port EPc opens on the front surface of the cylinder head 20b. Accordingly, a middle head exhaust outlet 20b1c, through which exhaust gas flows out, is provided on the front surface of the cylinder head 20b. Thus, exhaust gas flows out from the cylinder head 20b.

The right combustion chamber 200r is a space surrounded by a right piston (not shown) located at the top dead center, a cylinder head 20b, a right intake valve (not shown), and a right exhaust valve (not shown). The right combustion chamber 200r is connected to the right cylinder hole 202r. The right combustion chamber 200r is a space for combustion of a mixture of fuel (e.g., gasoline) and air. The right intake port IPr is a hole connecting the outside of the engine body 20 and the right combustion chamber 200r. The right intake port IPr directs intake air to the right combustion chamber 200r. Accordingly, the intake air passes through the right intake port IPr. The right intake port IPr opens on the rear surface of the cylinder head 20b. The right exhaust port EPr is a hole connecting the outside of the engine body 20 and the right combustion chamber 200r. The right exhaust port EPr directs exhaust gas generated by combustion of the mixture of fuel and air to the outside of the engine body 20. Thus, exhaust passes through the right exhaust port EPr. Thus, the right exhaust port EPr is part of the exhaust passage through which exhaust gas passes. The right exhaust port EPr opens on the front surface of the cylinder head 20b. Accordingly, a right head exhaust outlet 20b1r, through which exhaust gas flows out, is provided on the front surface of the cylinder head 20b. Thus, exhaust gas flows out from the cylinder head 20b.

The left intake valve (not shown) is provided at a boundary between the left intake port IPl and the left combustion chamber 200l. When the left intake valve opens, the left intake port IPl and the left combustion chamber 200l are connected. The intake air flows into the left combustion chamber 200l from the left intake port IPl accordingly. When the left intake valve closes, the left intake port IPl and the left combustion chamber 200l are shut off. Similarly, the middle intake valve (not shown) is provided at a boundary between the middle intake port IPc and the middle combustion chamber 200c. When the middle intake valve opens, the middle intake port IPc and the middle combustion chamber 200c are connected. The intake air flows into the middle combustion chamber 200c from the middle intake port IPc accordingly. When the middle intake valve closes, the middle intake port IPc and the middle combustion chamber 200c are shut off. Similarly, the right intake valve (not shown) is provided at a boundary between the right intake port IPr and the right combustion chamber 200r. When the right intake valve opens, the right intake port IPr and the right combustion chamber 200r are connected. The intake air flows into the right combustion chamber 200r from the right intake port IPr accordingly. When the right intake valve closes, the right intake port IPr and the right combustion chamber 200r are shut off.

The left exhaust valve (not shown) is provided at a boundary between the left exhaust port EPl and the left combustion chamber 200l. When the left exhaust valve opens, the left exhaust port EPl and the left combustion chamber 200l are connected. The exhaust gas flows out from the left combustion chamber 200l to the left exhaust port EPl accordingly. When the left exhaust valve closes, the left exhaust port EPl and the left combustion chamber 200l are shut off. Similarly, the middle exhaust valve (not shown) is provided at a boundary between the middle exhaust port EPc and the middle combustion chamber 200c. When the middle exhaust valve opens, the middle exhaust port EPc and the middle combustion chamber 200c are connected. The exhaust gas flows out from the middle combustion chamber 200c to the middle exhaust port EPc accordingly. When the middle exhaust valve closes, the middle exhaust port EPc and the middle combustion chamber 200c are shut off. Similarly, the right exhaust valve (not shown) is provided at a boundary between the right exhaust port EPr and the right combustion chamber 200r. When the right exhaust valve opens, the right exhaust port EPr and the right combustion chamber 200r are connected. The exhaust gas flows out from the right combustion chamber 200r to the right exhaust port EPr accordingly. When the right exhaust valve closes, the right exhaust port EPr and the right combustion chamber 200r are shut off.

A cylinder head 20b supports an intake side camshaft (not shown) and an exhaust side camshaft (not shown). The intake side camshaft and the exhaust side camshaft are arranged in the front-back direction fb. The intake side camshaft is positioned backward b of the exhaust side camshaft. The intake camshaft rotates on a center axis extending in the left-right direction lr. Accordingly, the intake side camshaft opens or closes the left intake valve, the middle intake valve, and the right intake valve. The exhaust side camshaft rotates on a center axis extending in the left-right direction lr. Thus, the exhaust side camshaft opens or closes the left exhaust valve, the middle exhaust valve, and the right exhaust valve.

The exhaust manifold 20f is arranged forward f of the cylinder head 20b. The exhaust manifold 20f is fixed to a cylinder head 20b. In the present embodiment, the exhaust manifold 20f is integrally formed with the cylinder head 20b. Therefore, the exhaust manifold 20f cannot be separated from the cylinder head 20b without damaging the cylinder head 20b and the exhaust manifold 20f. The exhaust manifold 20f forms a part of an exhaust passage through which exhaust gas passes that is flowing out of a left head exhaust outlet 20b1l of a left exhaust port EPl, a middle head exhaust outlet 20b1c of a middle exhaust port EPc and a right head exhaust outlet 20b1r of a right exhaust port EPr. The exhaust passage is a space surrounded by the inner peripheral surface of the exhaust manifold 20f. An exhaust manifold 20f combines three exhaust passages connected to a left exhaust port EPl, a middle exhaust port EPc and a right exhaust port EPr into one exhaust passage. As shown in FIG. 2, the exhaust manifold 20f extends obliquely from the cylinder head 20b toward the front-down direction fd. The tip end of the front-down direction fd of the exhaust manifold 20f is arranged forward f of the cylinder block 20c. As shown in FIG. 3, one outlet 20f1 through which exhaust gas flows out is provided at the tip end of the front-down direction fd of the exhaust manifold 20f. The outlet 20f1 opens toward the front-down direction fd. Accordingly, the exhaust gas flows out from the outlet port 20f1 toward the front-down direction fd.

The cylinder head cover 20a is arranged upward u of the cylinder head 20b. The cylinder head cover 20a is fixed to the cylinder head 20b. Thus, the cylinder head cover 20a covers the intake side camshaft (not shown) and the exhaust side camshaft (not shown).

The material of the engine body 20 configured as described above is iron, for example. However, the material of the engine body 20 may be aluminum or an aluminum alloy, or may be iron and aluminum. When the material of the engine body 20 is iron and aluminum, a part of the material of the engine body 20 is iron and the remaining part of the engine body 20 is aluminum. In addition, the engine body 20 is produced by way of casting, for example. In particular, in the present embodiment, the cylinder head 20b and the exhaust manifold 20f are integrally produced at the same time by casting.

The upstream intake pipe 30 (See FIG. 3), the turbocharger 26, the midstream intake pipe 32, the downstream intake pipe 34, the throttle body 36, and the intake manifold 38 form a pipe through which intake air passes. Hereinafter, the end of upstream in the direction along which the intake air flows in each member is referred to as the upstream end. The end of downstream in the direction along which the intake air flows in each member is referred to as the downstream end.

As shown in FIG. 3, the upstream intake pipe 30, the turbocharger 26, the midstream intake pipe 32, the intercooler 22 (See below for details), the downstream intake pipe 34, the throttle body 36, and the intake manifold 38 are connected in series in this order respectively from upstream to downstream in the direction along which the intake air flows. More specifically, the upstream end of the upstream intake pipe 30 is connected to an air cleaner box (not shown). The downstream end of the upstream intake pipe 30 is connected to the turbocharger 26. The upstream end of the midstream intake pipe 32 is connected to the turbocharger 26. The downstream end of the midstream intake pipe 32 is connected to the intercooler 22. The upstream end of the downstream intake pipe 34 is connected to the intercooler 22. The downstream end of the downstream intake pipe 34 is connected to the throttle body 36. The upstream end of the intake manifold 38 is connected to the throttle body 36. The downstream end of the intake manifold 38 is connected to the upstream end of the left intake port IPl (See FIG. 2), a middle intake port IPc (See FIG. 2) and a right intake port IPr (See FIG. 2). Thus, the intake air flows into the air cleaner box (not shown) from the outside of the straddled vehicle 1. The intake air passes through the air cleaner box, the upstream intake pipe 30, the turbocharger 26, the midstream intake pipe 32, the intercooler 22, the downstream intake pipe 34, the throttle body 36, the intake manifold 38 and the left intake port IPl, the middle intake port IPc, and the right intake port IPr, and flows into the left combustion chamber 200*l*, the middle combustion chamber 200*c*, and the right combustion chamber 200*r*.

The throttle body 36 regulates an amount of intake air flowing into the intake manifold 38. The structure of the throttle body 36 is the same as that of a common throttle body, and thus a description thereof will be omitted.

A left injector (not shown) is supported by the cylinder head 20*b*. The lower end of the left injector is positioned in the left combustion chamber 200*l*. The left injector injects fuel into the left combustion chamber 200*l*. As a result, the fuel is mixed with the intake air flowing into the left combustion chamber 200*l* to form the mixture of fuel and air. A left spark plug (not shown) is supported by the cylinder head 20*b*. The lower end of the left spark plug is positioned in the left combustion chamber 200*l*. The left spark plug ignites the mixture of fuel and air in the left combustion chamber 200*l*.

A middle injector (not shown) is supported by the cylinder head 20*b*. The lower end of the middle injector is positioned in the middle combustion chamber 200*c*. The middle injector injects fuel into the middle combustion chamber 200*c*. As a result, the fuel is mixed with the intake air flowing into the middle combustion chamber 200*c* to form the mixture of fuel and air. A middle ignition plug (not shown) is supported by the cylinder head 20*b*. The lower end of the middle ignition plug is positioned in the middle combustion chamber 200*c*. The middle ignition plug ignites the mixture of fuel and air in the middle combustion chamber 200*c*.

A right injector (not shown) is supported by the cylinder head 20*b*. The lower end of the right injector is positioned in the right combustion chamber 200*r*. The right injector injects fuel into the right combustion chamber 200*r*. As a result, the fuel is mixed with the intake air flowing into the right combustion chamber 200*r* to form the mixture of fuel and air. A right ignition plug (not shown) is supported by the cylinder head 20*b*. The lower end of the right spark plug is positioned in the right combustion chamber 200*r*. The right spark plug ignites the mixture of fuel and air in the right combustion chamber 200*r*.

The exhaust device 40 is a pipe through which exhaust gas passes. As shown in FIG. 2, the exhaust device 40 comprises an exhaust pipe 140, a muffler 142, a first catalyst 146, and a second catalyst 148. The details of the exhaust pipe 140, the muffler 142, the first catalyst 146, and the second catalyst 148 will be described later. Hereinafter, the end of upstream in the direction along which the exhaust gas flows in each member is referred to as the upstream end. The end of downstream in the direction along which the exhaust gas flows in each member is referred to as the downstream end. As shown in FIG. 2, the exhaust manifold 20*f*, the turbocharger 26 and the exhaust device 40 are connected in series in this order respectively from the upstream to the downstream in the direction along which the exhaust gas flows. More specifically, the upstream end of the exhaust manifold 20*f* is connected to the left exhaust port EPl, the middle exhaust port EPc and the right exhaust port EPr. The downstream end of the exhaust manifold 20*f* is connected to the turbocharger 26 (See below for details). The upstream end of the exhaust device 40 is connected to the turbocharger 26. As a result, the exhaust gas flows out from the left combustion chamber 200*l*, the middle combustion chamber 200*c* and the right combustion chamber 200*r* to the left exhaust port EPl, the middle exhaust port EPc and the right exhaust port EPr. The exhaust gas passes through the left exhaust port EPl, the middle exhaust port EPc, the right exhaust port EPr, the exhaust manifold 20*f*, the turbocharger 26 and the exhaust device 40, and flows out of the straddled vehicle 1. In this way, the turbocharger 26 and the exhaust device 40 also define an exhaust passage through which exhaust gas passes.

The engine body 20 is cooled by the cooling liquid for cooling the engine body 20 passing through the engine body 20. Hereinafter, the end of upstream the cooling liquid flows in each member is referred to as the upstr in the direction along which eam end. The end of downstream in the direction along which the cooling liquid flows in each member is referred to as the downstream end.

The engine body 20 has a water jacket (not shown) serving as a passage of cooling liquid for cooling the engine body 20. The downstream end of the water jacket is connected to the upstream end of the radiator 24 via a radiator upper hose (not shown). The upstream end of the water jacket is connected to the downstream end of the radiator 24 via a radiator lower hose (not shown). The engine body 20 is provided with a water pump (not shown). The water pump uses the driving force generated by the engine body 20 to circulate the cooling liquid between the engine body 20 and the radiator 24.

The radiator 24 cools the cooling liquid for cooling the engine body 20. More specifically, the cooling liquid passes through the water jacket of the engine body 20 to cool the engine body 20. During this process, the cooling liquid is heated by the engine body 20. The cooling liquid heated by the engine body 20 flows into the radiator 24 through the radiator upper hose. The radiator 24 cools the cooling liquid heated by the engine body 20. The cooling liquid cooled by the radiator 24 flows into the water jacket of the engine body 20 through the radiator lower hose.

The radiator 24 includes a radiator core 24*a*. As shown in FIG. 2, the radiator core 24*a* has a plate shape including a first main surface S1 having a normal vector extending in the forward direction F and a second main surface S2 having a normal vector extending in the back direction B. In the present embodiment, the radiator core 24*a* has a rectangular plate shape when viewed in the back direction B. The radiator core 24*a* is slightly curved such that the center of the radiator core 24*a* in the left-right direction lr projects backward B of the left end of the radiator core 24*a* and the right end of the radiator core 24*a*. This suppresses interference between the radiator core 24*a* and the front wheel 4. The radiator core 24*a* is leaned backward B with respect to the up-down direction UD. In other words, the first main surface S1 is leaned backward B with respect to the up-down direction UD. The upper end of the first main surface S1 is located farther in the backward direction B than the lower end of the first main surface S1.

The radiator core 24a includes a radiator fin and a plurality of tubes. The radiator core 24a does not include a radiator upper hose, a radiator lower hose, a radiator cap, a reservoir tank, an upper tank, a lower tank, or an electric fan. The plurality of tubes is arranged, for example, so as to extend in the left-right direction lr in the radiator core 24a. The radiator fin is arranged so as to be in contact with the tube. While the straddled vehicle 1 travels, the wind blows against the radiator core 24a from the forward direction F. Such windcools the cooling liquid passing through the tube.

The radiator 24 configured as described above is arranged at a position where the wind blows against from the forward direction F of the straddled vehicle 1 while the straddled vehicle 1 travels. Accordingly, as shown in FIG. 2, the radiator 24 is arranged backward B of the front wheel 4 as well as forward direction F of the crankcase 20d and the oil pan 20e of the engine body 20. As shown in FIG. 4, the center of the left-right direction lr of the radiator core 24a overlaps the front wheel 4 when viewed in the backward direction B.

[The Structure of the Turbocharger]

Next, the structure of the turbocharger 26 will be described with reference to FIGS. 2 to 4. The turbocharger 26 compresses intake air by exhaust gas flowing out of the engine body 20, and supplies the intake air to the engine body 20. The turbocharger 26 includes a turbine wheel 126a rotated by exhaust gas of the engine body 20, and a compressor wheel 126b connected to the turbine wheel 126a and rotated together with the turbine wheel 126a, and pressurizes intake air by rotation of the compressor wheel 126b. The turbocharger 26 will now be described in more detail.

As shown in FIG. 3, the turbocharger 26 includes the turbine wheel 126a, the compressor wheel 126b, a shaft 126c, and a turbocharger case 226. As shown in FIG. 2, the turbine wheel 126a has a circular shape when viewed in the left direction 1. The turbine wheel 126a has a plurality of blades. The compressor wheel 126b is arranged to the left 1 of the turbine wheel 126a. The compressor wheel 126b has a circular shape when viewed in the right direction r. The compressor wheel 126a has a plurality of blades. The shaft 126c is a rod-like member extending in the left-right direction lr. The shaft 126c connects the turbine wheel 126a and the compressor wheel 126b. As a result, the turbine wheel 126a and the compressor wheel 126b can rotate together on the central axis of the shaft 126c.

The turbocharger case 226 houses the turbine wheel 126a, the compressor wheel 126b, and the shaft 126c. The turbocharger case 226 includes a turbine housing 226a, a compressor housing 226b, and a center housing 226c. The center housing 226c has a cylindrical shape having a central axis extending in the left-right direction lr. The center housing 226c supports the shaft 126c via a bearing, which is not shown. The shaft 126c can rotate on the center axis of the shaft 126c with respect to the center housing 226c.

The turbine housing 226a is arranged to the right r of the center housing 226c. The turbine housing 226a is fixed to the center housing 226c. The turbine housing 226a houses the turbine wheel 126a. As shown in FIG. 3, a downstream end of the exhaust manifold 20f is connected to an upper surface of the turbine housing 226a. Accordingly, the upstream end 226a1 of the turbine housing 226a is a joint surface with the downstream end of the exhaust manifold 20f. In the present embodiment, the flange provided at the upstream end portion of the turbine housing 226a and the flange provided at the downstream end portion of the exhaust manifold 20f are fixed each other by fasteners such as bolts and nuts. Accordingly, the upstream end 226a1 of the turbine housing 226a is a surface that is in contact with the exhaust manifold 20f at the flange of the turbine housing 226a. Thus, the turbocharger 26 is fixed to the engine body 20.

The upstream end of the exhaust device 40 is connected to the right surface of the turbine housing 226a. Accordingly, the downstream end 226a2 of the turbine housing 226a is a joint surface with the upstream end of the exhaust device 40. In the present embodiment, the flange provided at the downstream end portion of the turbine housing 226a and the flange provided at the upstream end portion of the exhaust device 40 are fixed each other by fasteners such as bolts and nuts. Accordingly, the downstream end 226a2 of the turbine housing 226a is a surface that is in contact with the exhaust device 40 at the flange of the turbine housing 226a.

The compressor housing 226b is arranged to the left 1 of the center housing 226c. The compressor housing 226b is fixed to the center housing 226c. The compressor housing 226b houses a compressor wheel 126b. As shown in FIG. 4, the downstream end of the upstream intake pipe 30 is connected to the left surface of the compressor housing 226b. As shown in FIG. 4, the upstream end of the midstream intake pipe 32 is connected to the front surface of the compressor housing 226b.

The turbocharger 26 configured as described above operates as described below. First, the exhaust gas flows from the exhaust manifold 20f into the turbine housing 226a. The exhaust gas blows against the blades of the turbine wheel 126a. As a result, the turbine wheel 126a rotates on the central axis of the shaft 126c. The exhaust gas flows out of the turbine housing 226a and flows into the exhaust device 40. In this way, the turbine housing 226a forms an exhaust passage. The exhaust passage is a space formed by the inner peripheral surface of the turbine housing 226a.

The compressor wheel 126b is connected to the turbine wheel 126a with a shaft 126c. Accordingly, the compressor wheel 126b rotates on the central axis of the shaft 126c in accordance with the rotation of the turbine wheel 126a. The intake air flows from the upstream intake pipe 30 into the compressor housing 226b. The intake air is compressed by the blades of the compressor wheel 126b. The compressed intake air flows out of the compressor housing 226b and flows into the midstream intake pipe 32.

As shown in FIG. 2, the turbocharger 26 is arranged backward B of the front wheel 4 and forward F of the cylinder block 20c of the engine body 20. As shown in FIG. 4, the turbocharger 26 is arranged upward U of the radiator 24 when viewed in the backward direction B. Furthermore, as shown in FIG. 2, at least a part of the turbine wheel 126a is arranged upward U of the front axle Axf of the front wheel 4. In the present embodiment, the turbine wheel 126a is arranged upward U of the front axle Axf of the front wheel 4.

[The Structure of the Intercooler]

Next, the structure of the intercooler 22 will be described with reference to FIGS. 2 to 4. The intercooler 22 cools the intake air pressurized by the turbocharger 26 and includes an intercooler core 22a. The intercooler 22 will now be described in more detail.

As shown in FIG. 4, the intercooler 22 includes the intercooler core 22a, an inlet header 22b, and an outlet header 22c. As shown in FIG. 2, the intercooler core 22a has a plate shape with a third main surface S3 having a normal vector extending in the forward direction F and a fourth main surface S4 having a normal vector extending in the backward direction B. In the present embodiment, the intercooler core 22a has a rectangular plate shape when viewed in the backward direction B. The intercooler core 22a is leaned forward direction F with respect to the up-down direction UD. In other words, the third main surface S3 is leaned forward direction F with respect to the up-down direction UD. The upper end of the third main surface S3 is positioned farther in the forward direction F of the lower end of the third main surface S3.

The inlet header 22b is arranged to the left l of the intercooler core 22a. The downstream end of the midstream intake pipe 32 is connected to the inlet header 22b. The outlet header 22c is arranged to the right r of the intercooler core 22a. The upstream end of the downstream intake pipe 34 is connected to the outlet header 22c.

The intercooler core 22a includes a radiator fin and a plurality of tubes. The intercooler core 22a does not include the inlet header 22b nor the outlet header 22c. The plurality of tubes is arranged, for example, so as to extend in the left-right direction lr in the intercooler core 22a. The radiator fin is arranged in contact with the tube. The intake air flows into a plurality of tubes through an inlet header 22b. The intake air passes through a plurality of tubes from left to right. While the straddled vehicle 1 travels, the wind blows against the intercooler core 22a from the forward direction F. Such wind cool the intake air passing through the tube. The cooled intake air flows through an outlet header 22c into a downstream intake pipe 34.

The intercooler 22 configured as described above is arranged at a position where the wind blows against the intercooler from the forward direction F of the straddled vehicle 1 while the straddled vehicle 1 travels. Accordingly, as shown in FIG. 2, the intercooler 22 is arranged backward B of the front wheel 4 and forward F of the cylinder head cover 20a and the cylinder head 20b of the engine body 20. As shown in FIG. 4, the lower portion of the intercooler core 22a overlaps the upper portion of the front wheel 4 when viewed in the backward direction B. The front wheel 4 is arranged at the center of the intercooler core 22a in the left-right direction lr. At least a part of the intercooler core 22a is positioned upward U of the front axle Axf of the front wheel 4 as shown in FIG. 2. In the present embodiment, the intercooler core 22a is positioned upward U of the front axle Axf of the front wheels 4.

As shown in FIG. 4, the intercooler 22 is arranged upward U of the radiator 24 and the turbocharger 26 when viewed in the backward direction B. Accordingly, as shown in FIG. 4, the turbine wheel 126a is arranged downward D of the intercooler 22 when viewed in the backward direction B. The turbine wheel 126a is arranged downward D of the intercooler core 22a and upward U of the radiator core 24a.

[The Structure of the Exhaust Device]

Next, the exhaust device 40 will be described with reference to FIGS. 1 to 4. The exhaust device 40 is a pipe through which exhaust gas passes. As shown in FIG. 2, the exhaust device 40 includes an exhaust pipe 140, a muffler 142, and a plurality of catalysts 145. The plurality of catalysts 145 includes a first catalyst 146 and a second catalyst 148.

The exhaust pipe 140 and the muffler 142 are connected to each other to form a portion of an exhaust passage through which the exhaust gas passes (i.e., a part of the exhaust passage), wherein the portion allows the exhaust gas passed through the turbocharger 26 to pass therethrough. The exhaust passage is a space surrounded by the inner peripheral surface of the exhaust pipe 140 and the muffler 142. As shown in FIG. 1, the exhaust pipe 140 and the muffler 142 are connected in series in this order respectively from upstream to downstream in the direction along which exhaust gas flows. More specifically, the upstream end of the exhaust pipe 140 is connected to the turbocharger 26. The upstream end of the muffler 142 is connected to the downstream end portion of the exhaust pipe 140. Specifically, the downstream end of the exhaust pipe 140 is positioned in the muffler 142 by inserting the downstream end portion of the exhaust pipe 140 into the muffler 142. Thus, the downstream end of the exhaust pipe 140 is not connected to the muffler 142, but the downstream end portion of the exhaust pipe 140 is connected to the muffler 142. Accordingly, the exhaust gas passes through the exhaust pipe 140 and the muffler 142 to flow out of the straddled vehicle 1.

The exhaust pipe 140 is a metal pipe having two bent parts. The exhaust pipe 140 may be comprised of one metal pipe or a plurality of metal pipes connected to each other. The connecting method may be a fastener such as a bolt and a nut, or may be welding. The cross-section of the exhaust pipe 140 has an annular shape. The cross-section of the exhaust pipe 140 refers to a cross-section orthogonal to the flow direction of exhaust gas. As shown in FIG. 2, the center axis Lex of the exhaust pipe 140 refers to a line passing through the center of the exhaust pipe 140 having an annular cross-sectional shape.

The exhaust pipe 140 includes a first corner section 140a, a first catalyst section 140b, a second corner section 140c, a second catalyst section 140d and a connection section 140e. The first corner section 140a, the first catalyst section 140b, the second corner section 140c, the second catalyst section 140d and the connection section 140e are arranged in series in this order respectively from upstream to downstream. The first corner section 140a, the first catalyst section 140b, the second corner section 140c, the second catalyst section 140d and the connection section 140e are continuously connected. Thus, the downstream end of the first corner section 140a matches the upstream end of the first catalyst section 140b. The downstream end of the first catalyst section 140b matches the upstream end of the second corner section 140c. The downstream end of the second corner section 140c matches the upstream end of the second catalyst section 140d. The downstream end of the second catalyst section 140d matches the upstream end of the connection section 140e.

The first corner section 140a is arranged forward F of the engine body 20. As shown in FIG. 3, the angle of the first corner section 140a is bent in the exhaust pipe 140. Accordingly, the center axis Lex of the exhaust pipe 140 is bent in the first corner section 140a. The center axis Lex of the exhaust pipe 140 extends in the right-down direction RD at the upstream end of the first corner section 140a. The center axis Lex of the exhaust pipe 140 extends in the down direction D at the downstream end of the first corner section 140a. Accordingly, the exhaust gas flows into the first corner section 140a toward the right-down direction RD, and flows out from the first corner section 140a in the down direction D. The plurality of catalysts 145 is not arranged in the first corner section 140a.

The first catalyst section 140b is arranged forward F of the engine body 20. As shown in FIG. 3, the first catalyst section 140b is a section extending linearly in the exhaust pipe 140. Accordingly, the center axis Lex of the exhaust pipe 140 extends linearly in the up-down direction UD in the first catalyst section 140b. Thus, the exhaust gas passes through the first catalyst section 140b in the down direction D. The first catalyst 146 is arranged in a first catalyst section 140b. The upstream end of the first catalyst 146 is positioned farther in the downstream than the upstream end of the first catalyst section 140b. The downstream end of the first catalyst 146 is located farther in the upstream than the downstream end of the first catalyst section 140b. Thus, the entire of first catalyst 146 is housed in the first catalyst section 140b. It is noted that the upstream end of the first catalyst 146 may match the upstream end of the first catalyst section 140b. The downstream end of the first catalyst 146 may match the downstream end of the first catalyst section 140b. The exhaust gas passes through the first catalyst 146 in the down direction D.

The second corner section 140c is arranged in the front-down direction FD of the engine body 20. As shown in FIG. 2, the angle of the second corner section 140c is bent in the exhaust pipe 140. Therefore, the center axis Lex of the exhaust pipe 140 is bent in the second corner section 140c. The center axis Lex of the exhaust pipe 140 extends in the down direction D at the upstream end of the second corner section 140c. The center axis Lex of the exhaust pipe 140 extends in the backward direction B at the downstream end of the second corner section 140c. Accordingly, the exhaust gas flows into the second corner section 140c in the down direction D, and flows out from the second corner section 140c in the back direction B. A plurality of catalysts 145 is not arranged in the second corner section 140c.

The second catalyst section 140d is arranged downward D of the engine body 20. As shown in FIG. 2, the second catalyst section 140d is a section extending linearly in the exhaust pipe 140. Accordingly, the center axis Lex of the exhaust pipe 140 extends linearly in the front-back direction FB in the second catalyst section 140d. Therefore, the exhaust gas passes backward B through the second catalyst section 140d. The second catalyst 148 is arranged in the second catalyst section 140d. The upstream end of the second catalyst 148 is located farther in the downstream direction than the upstream end of the second catalyst section 140d. The downstream end of the second catalyst 148 is located farther in the upstream direction than the downstream end of the second catalyst section 140d. Therefore, the entire second catalyst 148 is housed in the second catalyst section 140d. It is noted that the upstream end of the second catalyst 148 may match the upstream end of the second catalyst section 140d. The downstream end of the second catalyst 148 may match the downstream end of the second catalyst section 140d. The exhaust gas passes backward B through the second catalyst 148.

The connection section 140e is arranged downward D of the engine body 20. As shown in FIG. 2, the connecting section 140e is a section extending linearly in the exhaust pipe 140. Accordingly, the center axis Lex of the exhaust pipe 140 extends linearly in the front-back direction FB in the connection section 140e. Thus, the exhaust gas passes through the connection section 140e in the back direction B.

As described above, the exhaust pipe 140 includes the second corner section 140c, which is bent in at least a part between the downstream end of the first catalyst 146 and the upstream end of the second catalyst 148. Accordingly, the angle of the second corner section 140c is bent and the second corner section 140c is not linearly. The first catalyst section 140b is extending linearly and the angle of the first catalyst section is not bent. The second catalyst section 140d is extending linearly and the angle of the second catalyst is not bent. Consequently, the boundary between the first catalyst section 140b and the second corner section 140c is a portion where the exhaust pipe 140 starts to bend when viewed in the downstream from the downstream end of the first catalyst 146. The boundary between the second catalyst section 140d and the second corner section 140c is a portion where the exhaust pipe 140 starts to bend when viewed in the upstream from the upstream end of the second catalyst 148.

The cross-sectional area of an internal space of the exhaust pipe 140 (i.e., the exhaust passage) which is orthogonal to the direction in which exhaust gas flows is defined as the exhaust pipe internal area. The maximum value of the exhaust pipe internal area S11 between the upstream end of the exhaust pipe 140 and the upstream end of the first catalyst 146 is more than or equal to the maximum value of the exhaust pipe internal area S12 between the upstream end of the first catalyst 146 and the downstream end of the first catalyst 146. Thus, the maximum value of the inner diameter (diameter of inner peripheral surface) of the exhaust pipe 140 between the upstream end of the exhaust pipe 140 and the upstream end of the first catalyst 146 is more than or equal to the maximum value of the inner diameter of the exhaust pipe 140 between the upstream end of the first catalyst 146 and the downstream end of the first catalyst 146. In the present embodiment, the average value of the exhaust pipe internal area S11 between the upstream end of the exhaust pipe 140 and the upstream end of the first catalyst 146 is more than or equal to the average value of the exhaust pipe internal area S12 between the upstream end of the first catalyst 146 and the downstream end of the first catalyst 146. Further, the minimum value of the exhaust pipe internal area S11 between the upstream end of the exhaust pipe 140 and the upstream end of the first catalyst 146 is more than or equal to the maximum value of the exhaust pipe internal area S12 between the upstream end of the first catalyst 146 and the downstream end of the first catalyst.

The maximum value of the exhaust pipe internal area S13 between the downstream end of the first catalyst 146 and the upstream end of the second catalyst 148 is more than or equal to the maximum value of the exhaust pipe internal area S14 between the upstream end of the second catalyst 148 and the downstream end of the second catalyst 148. Therefore, the maximum value of the inner diameter of the exhaust pipe 140 between the downstream end of the first catalyst 146 and the upstream end of the second catalyst 148 is more than or equal to the maximum value of the inner diameter of the exhaust pipe 140 between the upstream end of the second catalyst 148 and the downstream end of the second catalyst 148. In the present embodiment, the average value of the exhaust pipe internal area S13 between the downstream end of the first catalyst 146 and the upstream end of the second catalyst 148 is more than or equal to the average value of the exhaust pipe internal area S14 between the upstream end of the second catalyst 148 and the downstream end of the second catalyst 148. Further, the minimum value of the exhaust pipe internal area S13 between the downstream end of the first catalyst 146 and the upstream end of the second catalyst 148 is more than or equal to the maximum value of the exhaust pipe internal area S14 between the upstream end of the second catalyst 148 and the downstream end of the second catalyst 148.

The maximum value of the exhaust pipe internal area S15 between the downstream end of the second catalyst 148 and the downstream end of the exhaust pipe 140 is more than or equal to the maximum value of the exhaust pipe internal area S14 between the upstream end of the second catalyst 148 and the downstream end of the second catalyst 148. Therefore, the maximum value of the inner diameter of the exhaust pipe 140 between the downstream end of the second catalyst 148 and the downstream end of the exhaust pipe 140 is more than or equal to the maximum value of the inner diameter of the exhaust pipe 140 between the upstream end of the second catalyst 148 and the downstream end of the second catalyst 148. In the present embodiment, the average value of the exhaust pipe internal area S15 between the downstream end of the second catalyst 148 and the downstream end of the exhaust pipe 140 is more than or equal to the average value of the exhaust pipe internal area S14 between the upstream end of the second catalyst 148 and the downstream end of the second catalyst 148. Further, the minimum value of the exhaust pipe internal area S15 between the downstream end of the second catalyst 148 and the downstream end of the exhaust pipe 140 is more than or equal to the maximum value of the exhaust pipe internal area S14 between the upstream end of the second catalyst 148 and the downstream end of the second catalyst 148.

The minimum value of the exhaust pipe internal area S13 in the second corner section 140c is more than or equal to the exhaust pipe internal area S16 at the downstream end of the exhaust pipe 140. Therefore, the minimum value of the inner diameter of the exhaust pipe 140 in the second corner section 140c is more than or equal to the inner diameter of the exhaust pipe 140 at the downstream end of the exhaust pipe 140.

The minimum value of the exhaust pipe internal area S13 in the second corner section 140c is more than or equal to the cross-sectional area of the exhaust passage at the upstream end of the turbocharger 26. The cross-sectional area of the exhaust passage is orthogonal to the direction in which the exhaust gas of the exhaust passage flows. In FIGS. 2 and 3, the exhaust pipe internal areas S11 to S16 are shown without presenting the wall thickness of the exhaust pipe 140. However, the outer edge of the exhaust pipe internal areas S11 to S16 is actually away from the outer edge of the exhaust pipe 140 by the wall thickness of the exhaust pipe 140.

The exhaust device 40 further includes an exhaust pipe fixture 300. The exhaust pipe fixture 300 is a metal fitting for fixing the exhaust pipe 140 to the engine body 20. Thus, the exhaust pipe 140 is fixed to the engine body 20.

The muffler 142 is arranged in the back-down direction BD of the engine body 20. The muffler 142 has a hollow box shape. The muffler 142 reduces noise due to exhaust. A downstream end portion of the connection section 140e is inserted into the front surface of the muffler 142. The exhaust gas flows out from the rear portion of the muffler 142. The internal structure of the muffler 142 is the same as that of a common muffler, and thus a description thereof will be omitted.

The exhaust device 40 further includes a muffler fixture 302. The muffler fixture 302 is a metal fitting for fixing the muffler 142 to the vehicle body frame 2. Thus, the muffler 142 is fixed to the vehicle body frame 2.

The first catalyst 146 is arranged in the first catalyst section 140b as described above. The second catalyst 148 is arranged in the second catalyst section 140d as described above. The first catalyst section 140b is located farther in the downstream than the second catalyst section 140d. Accordingly, the first catalyst 146 and the second catalyst 148 are arranged in this order respectively along the direction in which the exhaust gas flows through the exhaust pipe 140. It is note that the plurality of catalysts 145 is not arranged between the first catalyst 146 and the second catalyst 148 in the exhaust pipe 140. The first catalyst section 140b is arranged forward F of the engine body 20. Accordingly, the first catalyst 146 is arranged forward F of the engine body 20. The second catalyst section 140d is arranged downward D of the engine body 20. Thus, the second catalyst 148 is arranged downward D of the engine body 20. Accordingly, the second catalyst 148 is arranged downward D of the left combustion chamber 200l, the middle combustion chamber 200c, and the right combustion chamber 200r when viewed in the left direction L or the right direction R. In the present embodiment, the second catalyst 148 is arranged downward D of the right combustion chamber 200r.

Figure 5:
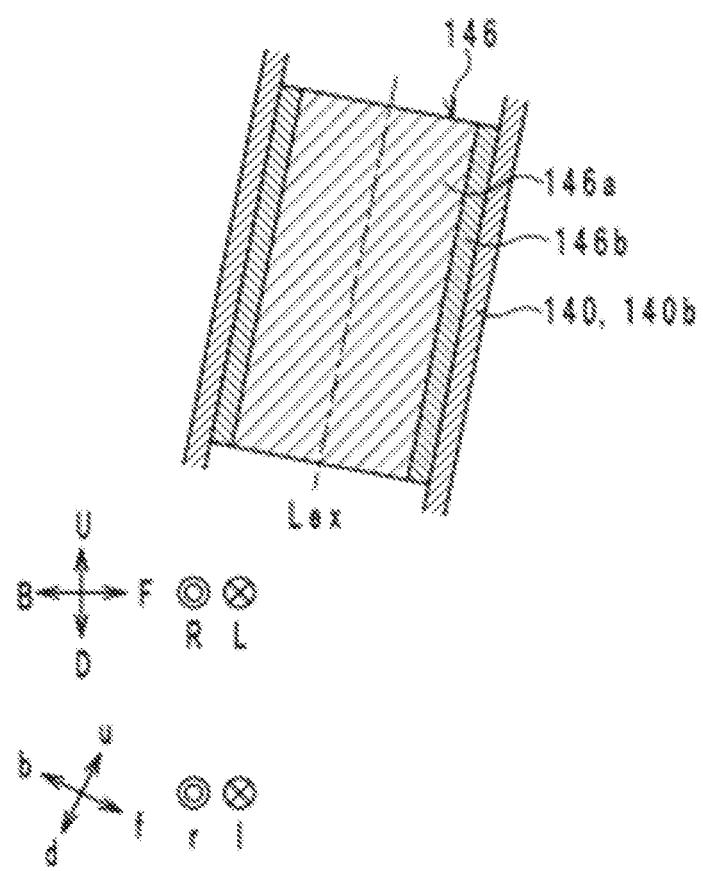
FIG. 5 is a cross-sectional structure view of an exhaust pipe 140 and a first catalyst 146.

The structures of the first catalyst 146 and the second catalyst 148 will be described below with reference to the drawings. FIG. 5 is a cross-sectional structure view of the exhaust pipe 140 and the first catalyst 146. FIG. 6 is a cross-sectional structure view of the exhaust pipe 140 and the second catalyst 148. FIGS. 5 and 6 are cross-sectional structural views of a cross-section including the central axis Lex and orthogonal to the left-right direction LR.

The first catalyst 146 has a cylindrical shape. The first catalyst 146 is a three-way catalyst. The three-way catalyst removes three substances hydrocarbon (HC), carbon monoxide (CO) and nitrogen oxide (NOx) from exhaust gas by an oxidation reaction or a reduction reaction. The three-way catalyst is included in redox catalysts. The first catalyst 146 may be a catalyst for removing one or two of hydrocarbons, carbon monoxide, and nitrogen oxides. The first catalyst 146 does not have to be a redox catalyst. The first catalyst 146 may be an oxidation catalyst for removing harmful substances only by oxidation. The first catalyst 146 may be a reduction catalyst for removing harmful substances only by reduction. As shown in FIG. 5, the first catalyst 146 includes a first catalyst body 146a and a first catalyst outer cylinder 146b. The first catalyst body 146a has a cylindrical shape. The length of the first catalyst body 146a is larger than the diameter of the first catalyst body 146a. The length of the first catalyst body 146a is the length in the direction along which the exhaust gas of the first catalyst body 146a flows. In the present specification, the length of the first catalyst 146 means the length of the first catalyst body 146a. In the present specification, the diameter of the first catalyst 146 means the diameter of the first catalyst body 146a. The first catalyst body 146a has a porous structure. The porous structure is a structure in which a plurality of holes penetrating in the direction along which exhaust gas flows are formed. The first catalyst body 146a may be a metal base catalyst or a ceramic base catalyst.

The first catalyst outer cylinder 146b has a cylindrical shape. The outer diameter of the first catalyst outer cylinder 146b (diameter of the outer peripheral surface) is substantially equal to the inner diameter (diameter of inner peripheral surface) of the first catalyst section 140b of the exhaust pipe 140. The first catalyst outer cylinder 146b covers the side surface of the first catalyst body 146a having a cylindrical shape. The first catalyst outer cylinder 146b is, for example, made of a metal.

As shown in FIG. 5, the first catalyst 146 comprised as described above is arranged in the first catalyst section 146b of the exhaust pipe 140 so that the outer peripheral surface of the first catalyst outer cylinder 146b comes into contact with the inner peripheral surface of the first catalyst section 140b of the exhaust pipe 140. Thus, when the exhaust gas passes through the first catalyst section 140b, the exhaust gas passes through the first catalyst 146.

The second catalyst 148 has a cylindrical shape. The second catalyst 148 is a three-way catalyst. The three-way catalyst removes three substances of hydrocarbon (HC), carbon monoxide (CO) and nitrogen oxide (NOx) from exhaust gas by an oxidation reaction or a reduction reaction. The three-way catalyst is included in redox catalysts. The second catalyst 148 may be a catalyst for removing one or two of hydrocarbons, carbon monoxide, and nitrogen oxides. The second catalyst 148 does not have to be a redox catalyst. The second catalyst 148 may be an oxidation catalyst for removing harmful substances only by oxidation. The second catalyst 148 may be a reduction catalyst for removing harmful substances only by reduction. As shown in FIG. 6, the second catalyst 148 includes a second catalyst body 148a and a second catalyst outer cylinder 148b. The second catalyst body 148a has a cylindrical shape. The second catalyst body 148a has a porous structure. The porous structure is a structure in which a plurality of holes penetrating in the direction along which exhaust gas flows are formed. The second catalyst body 148a may be a metal base catalyst or a ceramic base catalyst.

The second catalyst outer cylinder 148b has a cylindrical shape. The outer diameter of the second catalyst outer cylinder 148b (diameter of the outer peripheral surface) is substantially equal to the inner diameter (diameter of inner peripheral surface) of the second catalyst section 140d of the exhaust pipe 140. The second catalyst outer cylinder 148b covers the side surface of the second catalyst body 148a having a cylindrical shape. The second catalyst outer cylinder 148b is, for example, made of a metal.

As shown in FIG. 6, the second catalyst 148 comprised as described above is arranged in the second catalyst section 140d of the exhaust pipe 140 so that the outer peripheral surface of the second catalyst outer cylinder 148b comes into contact with the inner peripheral surface of the second catalyst section 140d of the exhaust pipe 140. Thus, when the exhaust gas passes through the second catalyst section 140d, the exhaust gas passes through the second catalyst 148.

The first catalyst 146 works as a main catalyst. The second catalyst 148 works as a sub-catalyst. Accordingly, the purification performance of the first catalyst 146 is the highest among the purification performance of plurality of catalysts 145. Therefore, the purification performance of the first catalyst 146 is higher than the purification performance of the second catalyst 148. Thus, the volume V1 of the first catalyst 146 is more than or equal to the volume V2 of the second catalyst 148. In the present specification, the volume V1 of the first catalyst 146 is the volume of the first catalyst body 146a. The volume V2 of the second catalyst 148 is the volume of the second catalyst body 148a. The first catalyst body 146a and the second catalyst body 148a have a porous structure. Therefore, the volume V1 of the first catalyst body 146a is the sum of the volume of the member forming the first catalyst body 146a and the volume of the plurality of holes penetrating in the direction along which the exhaust gas flows. The volume V2 of the second catalyst body 148a is the sum of the volume of the member forming the second catalyst body 148a and the volume of the plurality of holes penetrating in the direction along which the exhaust gas flows. The volume V2 of the second catalyst 148 is more than or equal to half of the volume V1 of the first catalyst 146 and less than or equal to the volume V1 of the first catalyst 146.

In the present embodiment, the diameter of the first catalyst body 146a is more than or equal to the diameter of the second catalyst body 148a in order to hold the relationship between the volume V1 of the first catalyst 146 and the volume V2 of the second catalyst 148. Further, the length of the first catalyst body 146a is more than or equal to the length of the second catalyst body 148a. The length of the first catalyst body 146a is the length in the direction along which the exhaust gas of the first catalyst body 146a flows. The first catalyst body 146a has a cylindrical shape, and thus the length of the first catalyst body 146a is the length of the central axis of the first catalyst body 146a. The length of the second catalyst body 148a is the length in the direction along which the exhaust gas of the second catalyst body 148a flows. The second catalyst body 148a has a cylindrical shape, and thus the length of the second catalyst body 148a is the length of the center axis of the second catalyst body 148a.

The maximum value of the cross-sectional area S22 of the second catalyst 148 is more than or equal to half of the maximum value of the cross-sectional area S21 of the first catalyst 146 and less than or equal to the maximum value of the cross-sectional area S21 of the first catalyst 146. In the present embodiment, the first catalyst 146 and the second catalyst 148 have a cylindrical shape. Therefore, the cross-sectional area S22 of the second catalyst 148 is more than or equal to half of the cross-sectional area S21 of the first catalyst 146 and less than or equal to the cross-sectional area S21 of the first catalyst 146. Accordingly, the diameter of the second catalyst 148 is more than or equal to $1/\sqrt{2}$ times of the diameter of the first catalyst 146 and less than or equal to the diameter of the first catalyst 146. The cross-sectional area S21 of the first catalyst 146 is a cross-sectional area orthogonal to a direction in which exhaust gas of the first catalyst 146 flows. The cross-sectional area S22 of the second catalyst 148 is a cross-sectional area orthogonal to the direction in which the exhaust gas of the second catalyst 148 flows. The first catalyst body 146a and the second catalyst body 148a have a porous structure. Accordingly, the cross-sectional area S21 of the first catalyst body 146a is the sum of the cross-sectional area of the member forming the first catalyst body 146a and the cross-sectional areas of the plurality of holes penetrating in the direction along which the exhaust gas flows. The cross-sectional area S22 of the second catalyst body 148a is the sum of the cross-sectional area of the member forming the second catalyst body 148a and the cross-sectional areas of the plurality of holes penetrating in the direction along which exhaust gas flows.

The length of the exhaust passage from the downstream end of the left exhaust port EPl to the upstream end of the first catalyst 146 is shorter than the length of the exhaust passage from the upstream end of the first catalyst 146 to the downstream end of the second catalyst 148. The length of the exhaust passage from the downstream end of the middle exhaust port EPc to the upstream end of the first catalyst 146 is shorter than the length of the exhaust passage from the upstream end of the first catalyst 146 to the downstream end of the second catalyst 148. The length of the exhaust passage from the downstream end of the right exhaust port EPr to the upstream end of the first catalyst 146 is shorter than the length of the exhaust passage from the upstream end of the first catalyst 146 to the downstream end of the second catalyst 148.

The length of the exhaust passage from the downstream end of the second catalyst 148 to the downstream end of the exhaust pipe 140 is shorter than the length of the exhaust passage from the upstream end of the first catalyst 146 to the downstream end of the second catalyst 148.

[Effects]

According to the straddled vehicle 1, the size of the second catalyst 148 can be increased and large displacement of the exhaust device 40 relative to the vehicle body frame 2 and the engine body 20 can be suppressed. More specifically, in the straddled vehicle 1, the volume V2 of the second catalyst 148 is more than half or equal to of the volume V1 of the first catalyst 146. As described above, the straddled vehicle 1 includes a large second catalyst 148.

However, as the second catalyst 148 increases its size, the exhaust device 40 increases its weight. As a result, the exhaust device 40 is likely to be largely displaced relative to the vehicle body frame 2 and the engine body 20 due to the vibration or the like. In order to suppress displacement of the exhaust device 40 relative to the vehicle body frame 2 and the engine body 20 caused by vibration or the like, the exhaust device 40 is preferably firmly supported by the vehicle body frame 2 or the engine body 20. However, the straddled vehicle 1 has restricted positions where the exhaust device 40 is supported by the vehicle body frame 2 or the engine body 20.

Accordingly, the maximum value of the exhaust pipe internal area S11 between the upstream end of the exhaust pipe 140 and the upstream end of the first catalyst 146 is more than or equal to the maximum value of the exhaust pipe internal area S12 between the upstream end of the first catalyst 146 and the downstream end of the first catalyst 146. Further, the maximum value of the exhaust pipe internal area S13 between the downstream end of the first catalyst 146 and the upstream end of the second catalyst 148 is more than or equal to the maximum value of the exhaust pipe internal area S14 between the upstream end of the second catalyst 148 and the downstream end of the second catalyst 148. Thus, as will be described below, the increased rigidity of the exhaust device 40 can suppress large displacement of the exhaust device 40 relative to the vehicle body frame 2 and the engine body 20 caused by vibration or the like.

The maximum value of the exhaust pipe internal area S11 between the upstream end of the exhaust pipe 140 and the upstream end of the first catalyst 146 is more than or equal to the maximum value of the exhaust pipe internal area S12 between the upstream end of the first catalyst 146 and the downstream end of the first catalyst 146. As a result, the vicinity of the upstream end of the exhaust pipe 140 becomes thicker, and the rigidity of the vicinity of the upstream end of the exhaust pipe 140 increases. The upstream end of the exhaust pipe 140 is connected to the turbocharger 26. This results in increased rigidity of the vicinity of the portion of the exhaust pipe 140 supported by the turbocharger 26. Accordingly, the exhaust pipe 140 is suppressed from largely vibrating with a portion of the exhaust pipe 140 supported by the turbocharger 26, which works as a fixed end.

By the way, the second corner section 140c is bent. Accordingly, the portion located farther in the downstream than the second corner section 140c of the exhaust pipe 140 extends in the different direction from the portion located farther in the upstream than the second corner section 140c of the exhaust pipe 140. Thus, even if the vibration of the portion of the exhaust pipe 140 located farther in the upstream than the second corner section 140c (for example, the first corner section 140a and the first catalyst section 140b) is suppressed due to the increased rigidity of the vicinity of the portion of the exhaust pipe 140 supported by the turbocharger 26, the portion of the exhaust pipe 140 located farther in the downstream than the second corner section 140c (for example, the second catalyst section 140d and the connection section 140e) may largely vibrate.

Consequently, in the straddled vehicle 1, the maximum value of the exhaust pipe internal area S13 between the downstream end of the first catalyst 146 and the upstream end of the second catalyst 148 is more than or equal to the maximum value of the exhaust pipe internal area S14 between the upstream end of the second catalyst 148 and the downstream end of the second catalyst 148. From this, the thickness of the second corner section 140c of the exhaust pipe 140 becomes thicker. Accordingly, the rigidity of the second corner section 140c of the exhaust pipe 140 increases. This suppresses the large vibration of the portion located farther in the downstream than the second corner section 140c of the exhaust pipe 140. As a result, the large displacement of the exhaust device 40 relative to the vehicle body frame 2 and the engine body 20 caused by vibration or the like is suppressed.

In the straddled vehicle 1, the size of a plurality of catalysts 145 can be increased. More specifically, the second corner section 140c is bent, and thus it is difficult to arrange a large catalyst 145 in such the second corner section 140c. In other words, when the catalyst 145 is arranged in the second corner section 140c, the catalyst 145 is downsized. Accordingly, in the straddled vehicle 1, the plurality of catalysts 145 is not arranged between the downstream end of the first catalyst 146 and the upstream end of the second catalyst 148 of the exhaust pipe 140. In other words, the plurality of catalysts 145 is not arranged in the second corner section 140c. As a result, the straddled vehicle 1 allows the plurality of catalysts 145 to make large.

In addition, according to the straddled vehicle 1, large displacement of the exhaust device 40 relative to the vehicle body frame 2 and the engine body 20 can be suppressed. More specifically, the downstream end portion of the exhaust pipe 140 is connected to the muffler 142. The muffler 142 has a large weight. In order to suppress vibration of the muffler 142, the muffler 142 is preferably firmly supported by the exhaust pipe 140. Accordingly, the maximum value of the exhaust pipe internal area S15 between the downstream end of the second catalyst 148 and the downstream end of the exhaust pipe 140 is more than or equal to the maximum value of the exhaust pipe internal area S14 between the upstream end of the second catalyst 148 and the downstream end of the second catalyst 148. From this, the thickness of the vicinity of the downstream end portion of the exhaust pipe 140 becomes thicker. Accordingly, the rigidity of the vicinity of the downstream end portion of the exhaust pipe 140 increases. As a result, the muffler 142 becomes firmly supported by the exhaust pipe 140. As described above, according to the straddled vehicle 1, large displacement of the exhaust device 40 relative to the vehicle body frame 2 and the engine body 20 can be suppressed.

In the straddled vehicle 1, the vicinities of both ends of the exhaust device 40 are fixed to the vehicle body frame 2 or the engine body 20. This enables to suppress large displacement of the exhaust device 40 relative to the vehicle body frame 2 and the engine body 20.

Further, according to the straddled vehicle 1, exhaust resistance is reduced. More specifically, the maximum value of the cross-sectional area S22 of the second catalyst 148 is half of or more than the maximum value of the cross-sectional area S21 of the first catalyst 146 and less than or equal to the maximum value of the cross-sectional area S21 of the first catalyst 146. Therefore, the maximum value of the cross-sectional area S22 of the second catalyst 148 is large. When the volume of the second catalyst 148 is a fixed value, the length in the direction along which the exhaust gas of the second catalyst 148 flows becomes shorter as the maximum value of the cross-sectional area S22 of the second catalyst 148 increases. Consequently, the exhaust resistance of the second catalyst 148 is reduced.

In the straddled vehicle 1, the length of the exhaust passage from the downstream end of the left exhaust port EPl to the upstream end of the first catalyst 146 is shorter than the length of the exhaust passage from the upstream end of the first catalyst 146 to the downstream end of the second catalyst 148. The length of the exhaust passage from the downstream end of the middle exhaust port EPc to the upstream end of the first catalyst 146 is shorter than the length of the exhaust passage from the upstream end of the first catalyst 146 to the downstream end of the second catalyst 148. The length of the exhaust passage from the downstream end of the right exhaust port EPr to the upstream end of the first catalyst 146 is shorter than the length of the exhaust passage from the upstream end of the first catalyst 146 to the downstream end of the second catalyst 148. From this, the length of the exhaust passage from the downstream end of the left exhaust port EPl to the upstream end of the first catalyst 146 becomes shorter. The length of the exhaust passage from the downstream end of the middle exhaust port EPc to the upstream end of the first catalyst 146 becomes shorter. The length of the exhaust passage from the downstream end of the right exhaust port EPr to the upstream end of the first catalyst 146 becomes shorter. Accordingly, exhaust gas at a high temperature passes through the first catalyst 146. As a result, the first catalyst 146 can show high purification performance.

OTHER EMBODIMENTS

Embodiments and variations that are at least described or illustrated herein are for facilitating understanding of the present disclosure and are not intended to limit the spirit of the present disclosure. The embodiments and variations described above may be modified and improved without departing from the purpose thereof.

Such purposes include equivalent elements, corrections, deletions, combinations (for example, combinations of features across embodiments and variations), improvements, and modifications that can be recognized by those skilled in the art based on the embodiments disclosed herein. The limitations in the claims should be interpreted broadly based on the terms used in the claims and should not be limited to the embodiments and variations described herein or during prosecution of the present application. Such embodiments and variations should be construed as being non-exclusive. For example, as used herein, the terms "preferably" and "may be" are non-exclusive and mean "be preferred but not limited to" and "may be but not limited to".

The straddled vehicle 1 has one front wheel 4. However, the number of the front wheel 4 of the straddled vehicle 1 is not limited to one. The straddled vehicle 1 may have two front wheels 4 or three or more front wheels 4.

The straddled vehicle 1 has one rear wheel 6. However, the number of rear wheel 6 of the straddled vehicle 1 is not limited to one. The straddled vehicle 1 may have two rear wheels 6 or three or more rear wheels 6.

As described above, the straddled vehicle 1 may be a three-wheeled vehicle or a four-wheeled vehicle. The straddled vehicle 1 may be an automobile having four or more wheels.

In the engine unit 10, the crankshaft axis Cr and the left cylinder axis CyLl intersect each other. The crankshaft axis Cr and the middle cylinder axis CyLc intersect each other. The crankshaft axis Cr and the right cylinder axis CyLr intersect each other. However, the crankshaft axis Cr does not have to intersect the left cylinder axis CyLl, the middle cylinder axis CyLc, and the right cylinder axis CyLr. In other words, the crankshaft axis Cr may be arranged slightly farther in the forward direction f or the backward direction b than the left cylinder axis CyLl, the middle cylinder axis CyLc, and the right cylinder axis CyLr.

The engine unit 10 includes two camshafts. In other words, the engine unit 10 is a DOHC (Double Over Head Camshaft) type engine. However, the engine unit 10 is not limited to a DOHC type engine. The engine unit 10 may be, for example, a SOHC (Single Over Head Camshaft) type engine or an OHV (Over Head Valve) type engine.

The engine unit 10 is a direct injection type engine in which an injector injects fuel into the left combustion chamber 200l, the middle combustion chamber 200c, and the right combustion chamber 200r. However, the engine unit 10 may be a port injection type engine in which an injector injects fuel into the intake manifold 38. A carburetor may be employed instead of the injector.

In the engine unit 10, the exhaust manifold 20f is integrally formed with the cylinder head 20b. However, in the engine unit 10, the exhaust manifold 20f may be separable from the cylinder head 20b without damaging the cylinder head 20b and the exhaust manifold 20f.

In the straddled vehicle 1, the vehicle body frame 2 is leaned leftward L when the straddled vehicle 1 turns leftward L. The vehicle body frame 2 is leaned rightward R when the straddled vehicle 1 turns rightward R. In other words, the straddled vehicle 1 is a leaning vehicle. However, the vehicle body frame 2 does not have to lean when the straddled vehicle 1 turns leftward L or rightward R. The vehicle body frame 2 may be leaned rightward R by centrifugal force when the straddled vehicle 1 turns leftward L. The vehicle body frame 2 may be leaned leftward L by the centrifugal force when the straddled vehicle 1 turns rightward R. In other words, the straddled vehicle 1 does not have to be a leaning vehicle. One example of the straddled vehicle 1 that is not a leaning vehicle is an ATV (All Terrain Vehicle).

The engine unit 10 is a water-cooled engine. However, the engine unit 10 is not limited to a water-cooled engine. The engine unit 10 may be, for example, an air-cooled engine or an oil-cooled engine.

The engine unit 10 is a gasoline engine. However, the engine unit 10 may be an engine supplied with a fuel other than gasoline. Examples of fuels other than gasoline include light oil and biodiesel.

The engine unit 10 is a parallel three-cylinder engine. However, the engine unit 10 may be a single-cylinder engine or a parallel two-cylinder engine. The engine unit 10 may be a parallel multi-cylinder engine having four or more cylinders. The engine unit 10 may be a V-type engine or a horizontally opposed engine.

In the straddled vehicle 1, the exhaust gas may pass through the first catalyst 146 in a direction other than downward D. The exhaust gas may pass through the second catalyst 148 in a direction other than backward B.

In the straddled vehicle 1, the maximum value of the exhaust pipe internal area S15 between the downstream end of the second catalyst 148 and the downstream end of the exhaust pipe 140 may be smaller than the maximum value of the exhaust pipe internal area S14 between the upstream end of the second catalyst 148 and the downstream end of the second catalyst 148.

In the straddled vehicle 1, the second catalyst 148 does not have to be located downward D of the left combustion chamber 200l, the middle combustion chamber 200c and the right combustion chamber 200r of the engine body 20 when viewed in the left direction L or the right direction R.

In the straddled vehicle 1, the maximum value of the cross-sectional area S22 of the second catalyst 148 may be smaller than half of the maximum value of the cross-sectional area S21 of the first catalyst 146 or more than the maximum value of the cross-sectional area S21 of the first catalyst 146.

The plurality of catalysts 145 may further include a third catalyst in addition to the first catalyst 146 and the second catalyst 148. The third catalyst may be, for example, arranged farther in the upstream than the first catalyst 146 in the exhaust pipe 140. The third catalyst may be arranged farther in the downstream than the downstream end of the first catalyst 146 and farther in the upstream than the upstream end of the second catalyst 148 in the exhaust pipe 140. It is noted that the third catalyst is not arranged in the second corner section 140c. The third catalyst may be arranged farther in the downstream than the downstream end of the second catalyst in the exhaust pipe 140. The third catalyst may be arranged in the muffler 142. Apart of the third catalyst may be arranged in the muffler 142, and the remaining part of the third catalyst may be arranged in the exhaust pipe 140. The plurality of catalysts 145 may include four or more catalysts.

As shown in FIG. 5, the outer peripheral surface of the first catalyst outer cylinder 146b is in contact with the inner peripheral surface of the exhaust pipe 140. However, the outer peripheral surface of the first catalyst outer cylinder 146b does not have to be in contact with the inner peripheral surface of the exhaust pipe 140. As shown in FIG. 6, the outer peripheral surface of the second catalyst outer cylinder 148b is in contact with the inner peripheral surface of the exhaust pipe 140. However, the outer peripheral surface of the second catalyst outer cylinder 148b does not have to be in contact with the inner peripheral surface of the exhaust pipe 140.

In the straddled vehicle 1, the exhaust pipe 140 is fixed to the engine body 20. However, the exhaust pipe 140 may be fixed to the vehicle body frame 2. The exhaust pipe 140 may be fixed to the vehicle body frame 2 and the engine body 20. However, when the muffler 142 is fixed to the vehicle body frame 2 or the engine body 20, the exhaust pipe 140 is fixed to the vehicle body frame 2 or the engine body 20 through the turbocharger 26 and the muffler 142. Accordingly, the exhaust pipe 140 does not have to be fixed to the vehicle body frame 2 and the engine body 20 through the exhaust pipe fixing tool.

In the straddled vehicle 1, the muffler 142 is fixed to the vehicle body frame 2. However, the muffler 142 may be fixed to the engine body 20. The muffler 142 may be fixed to the vehicle body frame 2 and the engine body 20. The muffler 142 does not have to be fixed to either the vehicle body frame 2 or the engine body 20.

In the straddled vehicle 1, an upstream end of an exhaust pipe 140 is fixed to a turbocharger 26, a first catalyst section 140b of the exhaust pipe 140 is fixed to an engine body 20, and a muffler 142 is fixed to a vehicle body frame 2. However, the way of fixing the exhaust device 40 to the vehicle body frame 2 and the engine body 20 is not limited to this example. For example, the first catalyst section 140b does not have to be fixed to either the engine body 20 or the muffler 142.

In the straddled vehicle 1, the volume V2 of the second catalyst 148 is less than or equal to the volume V1 of the first catalyst 146. However, the volume V2 of the second catalyst 148 may be larger than the volume V1 of the first catalyst 146. It is only required that the volume V2 of the second catalyst 148 is more than or equal to half of the volume V1 of the first catalyst 146.

In the straddled vehicle 1, the length of the first catalyst body 146a is larger than the diameter of the first catalyst body 146a. However, three ways described below may specify the sizes of the first catalyst body 146a and the second catalyst body 148a in the straddled vehicle 1. In the present specification, the length of the first catalyst 146 means the length of the first catalyst body 146a. In the present specification, the diameter of the first catalyst 146 means the diameter of the first catalyst body 146a. In the present specification, the length of the second catalyst 148 means the length of the second catalyst body 148a. In the present specification, the diameter of the second catalyst 148 means the diameter of the second catalyst body 148a.

The length of the first catalyst body 146a is larger than the diameter of the first catalyst body 146a, and the length of the second catalyst body 148a is larger than the diameter of the second catalyst body 148a.

The length of the first catalyst body 146a is larger than the diameter of the first catalyst body 146a, and the length of the second catalyst body 148a is smaller than or equal to the diameter of the second catalyst body 148a.

The length of the first catalyst body 146a is less than or equal to the diameter of the first catalyst body 146a, and the length of the second catalyst body 148a is larger than the diameter of the second catalyst body 148a.

The length of the first catalyst body 146a is less than or equal to the diameter of the first catalyst body 146a, and the length of the second catalyst body 148a is less than or equal to the diameter of the second catalyst body 148a.

REFERENCE SIGNS LIST 1 straddled vehicle
2 vehicle body frame
4 front wheel
6 rear wheel
8 steering mechanism
10 engine unit
12 seat
20 engine body
20a cylinder head cover
20b cylinder head
20b1c middle head exhaust outlet
20b1l left head exhaust outlet
20b1r right head exhaust outlet
20c cylinder block
20d crankcase
20e oil pan
20f exhaust manifold
20f1 outlet
22 intercooler
22a intercooler core
22b inlet header
22c outlet header
24 radiator
24a radiator core
26 turbocharger
30 upstream intake pipe
32 midstream intake pipe
34 downstream intake pipe
36 throttle body
38 intake manifold
40 exhaust device
45 catalyst
60 vehicle body frame
120 exhaust pipe
126a turbine wheel 126b compressor wheel
126c shaft
140 exhaust pipe
140a first corner section
140b first catalyst section
140c second corner section
140d second catalyst section
140e connection section
142 muffler
145 catalyst
146 first catalyst
146a first catalyst body
146b first catalyst outer cylinder
148 second catalyst
148a second catalyst body
148b second catalyst outer cylinder
200c middle combustion chamber
200l left combustion chamber
200r right combustion chamber
202c middle cylinder hole
202l left cylinder hole
202r right cylinder hole
226 turbocharger case
226a turbine housing
226b compressor housing
226c center housing
300 exhaust pipe fixture
302 muffler fixture
Axb rear axle
Axf front axle
Cr crankshaft axis
CyLc middle cylinder axis
CyLl left cylinder axis
CyLr right cylinder axis
EPc middle exhaust port
Epl left exhaust port
Epr right exhaust port
Ipc middle intake port
Ipl left intake port
Ipr right intake port
Lex center axis

The invention claimed is:

1. A straddled vehicle comprising:
a vehicle body frame; and
an engine unit supported by the vehicle body frame, the engine unit including:
an engine body having a cylinder head, through which exhaust gas flows out;
a turbocharger configured to compress intake air using the exhaust gas flowed out from the engine body, and to supply the intake air to the engine body; and
an exhaust device, including:
an exhaust pipe and a muffler that are connected to each other to form a portion of an exhaust passage through which the exhaust gas passes, the portion allowing the exhaust gas passed through the turbocharger to pass therethrough, and
a plurality of catalysts including a first catalyst and a second catalyst that are arranged in this order along a direction in which the exhaust gas flows through the exhaust pipe, wherein:
the exhaust pipe has an upstream end thereof connected to the turbocharger, and a downstream end thereof connected to the muffler,
the exhaust pipe includes a corner section that is bent in at least a part thereof between a downstream end of the first catalyst and an upstream end of the second catalyst, the plurality of the catalysts not being arranged in the corner section,
a volume of the second catalyst is more than or equal to half of a volume of the first catalyst, and
the exhaust pipe has an exhaust pipe internal area that is defined as a cross-sectional area of an internal space of the exhaust pipe orthogonal to the direction in which the exhaust gas flows, a maximum value of the exhaust pipe internal area between the upstream end of the exhaust pipe and an upstream end of the first catalyst being more than or equal to a maximum value of the exhaust pipe internal area between the upstream end of the first catalyst and the downstream end of the first catalyst, a maximum value of the exhaust pipe internal area between the downstream end of the first catalyst and the upstream end of the second catalyst being more than or equal to a maximum value of the exhaust pipe internal area between the upstream end of the second catalyst and a downstream end of the second catalyst.

2. The straddled vehicle according to claim 1, wherein the plurality of catalysts is not arranged between the downstream end of the first catalyst and the upstream end of the second catalyst of the exhaust pipe.

3. The straddled vehicle according to claim 1, wherein the exhaust gas passes downward through the first catalyst, and passes backward through the second catalyst.

4. The straddled vehicle according to claim 1, wherein a maximum value of the exhaust pipe internal area between the downstream end of the second catalyst and a downstream end of the exhaust pipe is more than or equal to the maximum value of the exhaust pipe internal area between the upstream end of the second catalyst and the downstream end of the second catalyst.

5. The straddled vehicle according to claim 1, wherein
the turbocharger is fixed to the engine body, and
the muffler is fixed to the vehicle body frame or the engine body.

6. The straddled vehicle according to claim 1, wherein the second catalyst is located below a combustion chamber of the engine body when viewed in a left-right direction of the straddled vehicle.

7. The straddled vehicle according to claim 1, wherein
a maximum value of a cross-sectional area of the second catalyst is more than or equal to half of a maximum value of a cross-sectional area of the first catalyst and less than or equal to the maximum value of the cross-sectional area of the first catalyst,
the cross-sectional area of the first catalyst is orthogonal to a direction in which the exhaust gas flows through the first catalyst,
the cross-sectional area of the second catalyst is orthogonal to a direction in which the exhaust gas flows through the second catalyst.

8. The straddled vehicle according to claim 1, wherein the volume of the second catalyst is less than or equal to the volume of the first catalyst.

9. The straddled vehicle according to claim 1, wherein
the engine body has an exhaust port through which the exhaust gas passes, and
a length of the exhaust passage from a downstream end of the exhaust port to the upstream end of the first catalyst is shorter than a length of the exhaust passage from the upstream end of the first catalyst to the downstream end of the second catalyst.

10. The straddled vehicle according to claim 1, wherein a length of the exhaust passage from the downstream end of the second catalyst to the downstream end of the exhaust pipe is shorter than the length of the exhaust passage from the upstream end of the first catalyst to the downstream end of the second catalyst.

11. The straddled vehicle according to claim 1, wherein a minimum value of the exhaust pipe internal area at the corner section is more than or equal to the exhaust pipe internal area at the downstream end of the exhaust pipe.

12. The straddled vehicle according to claim 1, wherein
   the cross-sectional area of the exhaust passage is the cross-sectional area that is orthogonal to a direction in which the exhaust gas flows through the exhaust passage, and
   a minimum value of the exhaust pipe internal area at the corner section is more than or equal to the cross-sectional area of the exhaust passage at an upstream end of the turbocharger.

13. The straddled vehicle according to claim 1, wherein
   a length of the first catalyst in the direction along which the exhaust gas flows is larger than a diameter of the first catalyst, and/or
   a length of the second catalyst in the direction along which the exhaust gas flows is larger than a diameter of the second catalyst.

\* \* \* \* \*